United States Patent
Haishima

(10) Patent No.: US 11,972,416 B2
(45) Date of Patent: Apr. 30, 2024

(54) TERMINAL APPARATUS AND INFORMATION MANAGEMENT SYSTEM

(71) Applicant: Universal Entertainment Corporation, Tokyo (JP)

(72) Inventor: Jun Haishima, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 123 days.

(21) Appl. No.: 17/431,799

(22) PCT Filed: Jan. 9, 2020

(86) PCT No.: PCT/JP2020/000522
§ 371 (c)(1),
(2) Date: Aug. 18, 2021

(87) PCT Pub. No.: WO2020/174890
PCT Pub. Date: Sep. 3, 2020

(65) Prior Publication Data
US 2022/0156729 A1  May 19, 2022

(30) Foreign Application Priority Data
Feb. 28, 2019 (JP) .................. 2019-036483

(51) Int. Cl.
*A63F 13/00* (2014.01)
*A63F 13/792* (2014.01)
(Continued)

(52) U.S. Cl.
CPC ......... *G06Q 20/381* (2013.01); *A63F 13/792* (2014.09); *G07F 17/32* (2013.01); *G07F 17/3244* (2013.01)

(58) Field of Classification Search
CPC .. G07F 17/34; G07F 17/3244; G07F 17/3267; G07F 17/3213; G07F 17/3258; G07F 17/3209
See application file for complete search history.

(56) References Cited

U.S. PATENT DOCUMENTS

| 2011/0195787 A1* | 8/2011 | Wells | ...................... G07F 17/32 463/47 |
| 2011/0195788 A1* | 8/2011 | Wells | .................... G07F 17/323 463/47 |

(Continued)

FOREIGN PATENT DOCUMENTS

| JP | 2007-018305 | 1/2007 |
| JP | 2013-141505 | 7/2013 |
| JP | 2015-144675 | 8/2015 |

*Primary Examiner* — David L Lewis
*Assistant Examiner* — Eric M Thomas
(74) *Attorney, Agent, or Firm* — LEX IP MEISTER, PLLC

(57) ABSTRACT

The present invention provides a terminal apparatus and an information management system that can facilitate to total sales and the like. A terminal apparatus communicably connected to a gaming machine in which a game can be played according to an inserted currency includes: a control device that executes an insertion process for converting an amount of the inserted currency into an amount of a specific currency based on a conversion rate for converting the amount of the inserted currency into the amount of the specific currency and a transmission device that transmits inserted currency information including currency information representing the type of the inserted currency and rate information representing the conversion rate used for conversion by the control device.

19 Claims, 17 Drawing Sheets

(51) Int. Cl.
    *G06Q 20/38*     (2012.01)
    *G07F 17/32*     (2006.01)

(56) References Cited

U.S. PATENT DOCUMENTS

2011/0195789 A1* 8/2011 Wells .................. G07F 17/3202
                                                        463/47
2014/0349742 A1   11/2014 Takeda

* cited by examiner

FIG. 9A

| INSERTED CURRENCY UNIT | DOLLAR |
|---|---|
| RATE | 1 PESO = 0.01 DOLLAR |

BETTING AMOUNT TABLE (CREDIT (PESO))

| | 3WAYS | 9WAYS | 27WAYS | 81WAYS | 243WAYS |
|---|---|---|---|---|---|
| 1—BET | 1(1PESO) | 3(3PESO) | 7(7PESO) | 15(15PESO) | 25(25PESO) |
| 2—BET | 2(2PESO) | 6(6PESO) | 14(14PESO) | 30(30PESO) | 50(50PESO) |
| 3—BET | 3(3PESO) | 9(9PESO) | 21(21PESO) | 45(45PESO) | 75(75PESO) |
| 5—BET | 5(5PESO) | 15(15PESO) | 35(35PESO) | 75(75PESO) | 125(125PESO) |
| 10—BET | 10(10PESO) | 30(30PESO) | 70(70PESO) | 150(150PESO) | 250(250PESO) |

BETTING AMOUNT TABLE (CREDIT (DOLLAR))

| | 3WAYS | 9WAYS | 27WAYS | 81WAYS | 243WAYS |
|---|---|---|---|---|---|
| 1-BET | 1 (0.01DOLLAR) | 3 (0.03DOLLAR) | 7 (0.07DOLLAR) | 15 (0.15DOLLAR) | 25 (0.25DOLLAR) |
| 2-BET | 2 (0.02DOLLAR) | 6 (0.06DOLLAR) | 14 (0.14DOLLAR) | 30 (0.30DOLLAR) | 50 (0.50DOLLAR) |
| 3-BET | 3 (0.03DOLLAR) | 9 (0.09DOLLAR) | 21 (0.21DOLLAR) | 45 (0.45DOLLAR) | 75 (0.75DOLLAR) |
| 5-BET | 5 (0.05DOLLAR) | 15 (0.15DOLLAR) | 35 (0.35DOLLAR) | 75 (0.75DOLLAR) | 125 (1.25DOLLAR) |
| 10-BET | 10 (0.10DOLLAR) | 30 (0.30DOLLAR) | 70 (0.70DOLLAR) | 150 (1.50DOLLAR) | 250 (2.50DOLLAR) |

FIG. 14

| HISTORY No | INSERTION (CONVERSION) DATE AND TIME (Occur Time) | INSTALLATION AREA (Location) | ASSET NUMBER (Asset #) | INSERTED CURRENCY (Currency) | DENOMINATION (Denomination) | RATE (Exchange Rate) | CONVERSION AMOUNT (Exchange Amount) |
|---|---|---|---|---|---|---|---|
| 001 | 2018.12.1 10:00:26 | C010202 | 1003001 | USD | 100 | 45.2314 | 4523.14PHP |
| 002 | 2018.12.1 10:01:35 | C010202 | 1003001 | USD | 100 | 45.2314 | 4523.14PHP |
| 003 | 2018.12.1 10:02:40 | C010202 | 1003005 | USD | 100 | 45.2314 | 4523.14PHP |
| 004 | 2018.12.1 10:02:55 | C010202 | 1003005 | USD | 50 | 45.2314 | 2261.57PHP |
| 005 | 2018.12.1 10:03:01 | C010204 | 1002014 | JPY | 10000 | 0.47544 | 4754.40PHP |
| ...... | ...... | ...... | ...... | ...... | ...... | ...... | ...... |

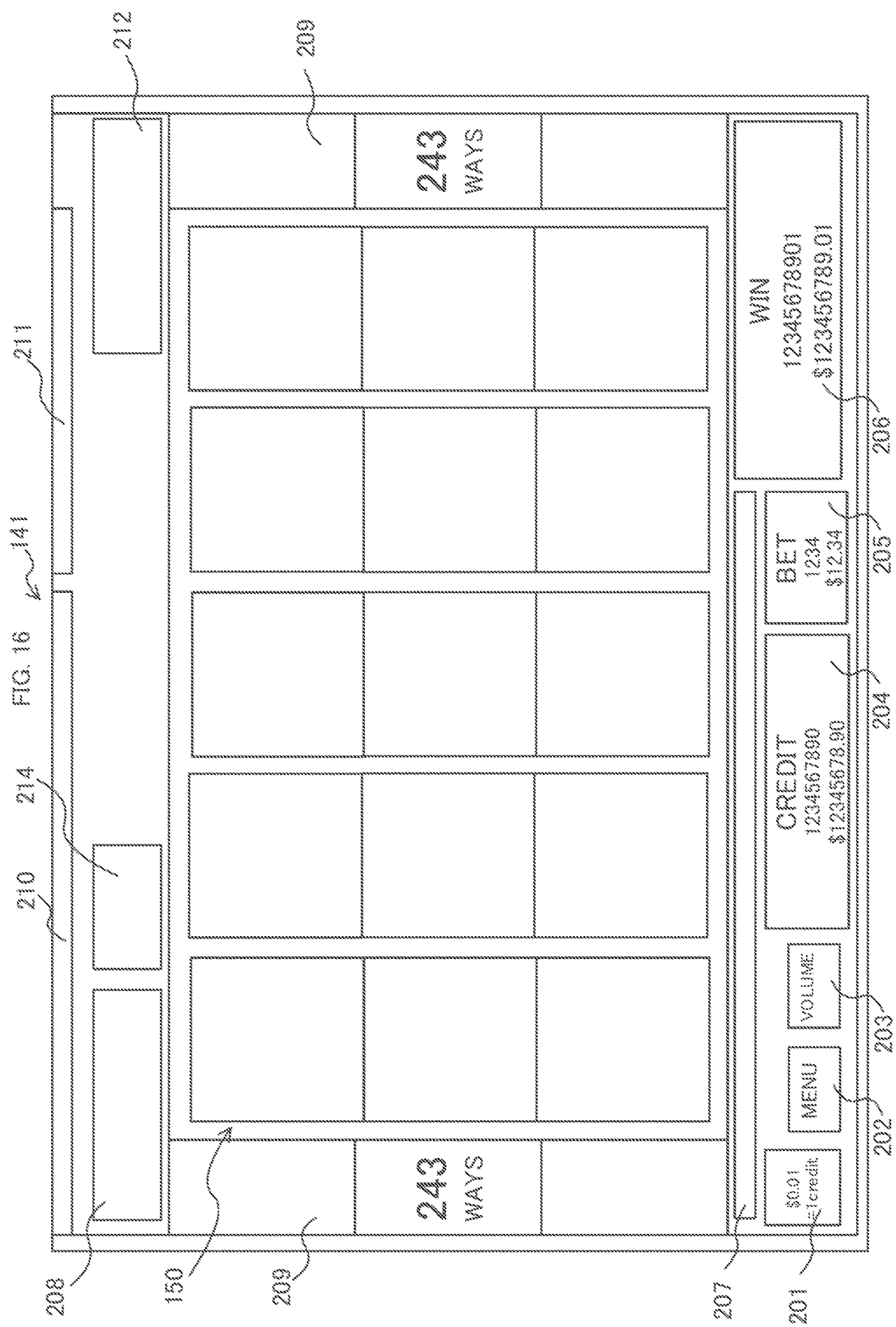

TERMINAL APPARATUS AND INFORMATION MANAGEMENT SYSTEM

TECHNICAL FIELD

The present invention relates to an information management system and a terminal apparatus in a casino or the like where a plurality of gaming machines such as slot machines are installed.

BACKGROUND ART

In a related art, as a gaming machine called an electronic gaming machine (EGM), for example, known is a gaming machine in which symbol rows are displayed on a display in a scrolled manner and a plurality of symbols are rearranged in a symbol display region where a plurality of pay lines are set.

In such a gaming machine, a player operates a control panel on which a plurality of buttons are disposed to determine the contents of bet for one game.

When playing a game on such a gaming machine in the related art, the player inserts a bill into a bill validator of a player tracking system (PTS) terminal provided on the gaming machine, so that amount information of the inserted bill is transmitted from the PTS terminal to the gaming machine, and the inserted amount of money is converted into credit data for playing the game in the gaming machine.

In such a gaming machine, bet reception and awarding of a prize are performed based on credit data converted from amount data represented by a predetermined home currency (specific currency). The player prepares a specific currency that can be handled by the gaming machine in advance, and inserts this currency to play the game.

As described above, the player needs to prepare the specific currency that can be handled by the gaming machine. For example, when the specific currency that can be handled by the gaming machine is "Philippine peso," if an American who possesses a "US dollar" bill, which is a currency (foreign currency) other than the specific currency, tries to play the game, first, he or she exchanges the "US dollar" bill for a "Philippine peso" bill at a currency exchange place different from that of the gaming machine (PTS terminal). Then, the game is played by inserting the exchanged "Philippine peso" bill into the PTS terminal provided in the gaming machine. As described above, in order to play the game, a player who possesses a cash currency other than the specific currency that can be used in the gaming machine needs to exchange the possessed currency with the specific cash currency at the currency exchange place other than the place where the gaming machine is installed, and there is a problem that the exchange takes time and efforts.

As one measure to solve such a problem, considered is a method in which a currency other than a specific currency can be inserted and identified in the PTS terminal provided in the gaming machine and amount data in the inserted currency obtained from the inserted currency is converted into amount data in the specific currency based on an exchange rate (see PTL 1).

A large number of gaming machines are installed in a facility for playing games such as a casino and it becomes large-scale, an area of the game facility exceeds 50,000 square meters and the number of gaming machines installed in the facility exceeds 3,000.

CITATION LIST

Patent Literature

PTL 1: International Publication WO2010/013600

SUMMARY OF INVENTION

Technical Problem

Meanwhile, when the inserted currency is a currency other than the specific currency, the conversion is performed using a conversion rate (exchange rate) between the inserted currency and the specific currency, but this conversion rate fluctuates with the passage of time. Accordingly, in a case of totaling the sales in each gaming machine, it is necessary to know the conversion rate when a foreign currency is inserted. The conversion rate is also necessary to calculate sales of the gaming machine.

In a network constructed by connecting a large number of gaming machines (EGMs), if a failure occurs even in a part of the network, it may be difficult to specify where the effect is, and it becomes unclear whether the conversion rate applied at the time of currency insertion was correct. For that reason, there was a problem that it was difficult to verify whether or not sales were calculated at an accurate conversion rate.

The present invention has been made in consideration of the above-described circumstances, and an object thereof is to provide a terminal apparatus and an information management system that makes it easy to check sales later even if a failure occurs.

Solution to Problems

The terminal apparatus of the present invention is a terminal apparatus communicably connected to a gaming machine in which a game can be played according to an inserted currency, and includes a control device that executes an insertion process for converting an amount of the inserted currency into an amount of a specific currency based on a conversion rate for converting the amount of the inserted currency into the amount of the specific currency, and a transmission device that transmits inserted currency information including currency information representing the type of the inserted currency and rate information representing the conversion rate used for conversion by the control device.

According to this configuration, the type of the inserted currency and the conversion rate used at the time of conversion are transmitted, thereby making it possible to easily total sales, and the like later.

In the terminal apparatus according to the configuration of the present invention, the transmission device transmits timing information representing the timing at which the insertion process is executed, together with the inserted currency information.

According to this configuration, the currency input time can be specified, thereby facilitating to verify a conversion result later based on the conversion rate at the time of inserting a certain currency.

The terminal apparatus according to the configuration of the present invention further includes a terminal information storage device that stores information transmitted from the transmission device.

According to this configuration, information can be compared between the terminal apparatus and a transmission destination, thereby facilitating subsequent check and verification work.

The terminal apparatus of the present invention is a terminal apparatus communicably connected to a gaming machine in which a game can be played according to an inserted currency, and includes a control device that executes an insertion process for converting an amount of the inserted currency into an amount of a specific currency based on a conversion rate for converting the amount of the inserted currency into the amount of the specific currency, and a transmission device that transmits inserted currency information including currency information representing the type of the inserted currency and timing information representing the timing at which the insertion process is executed.

According to this configuration, the timing information that specifies the type and insertion time of the inserted currency is output, thereby making it possible to easily total sales, and the like later.

The terminal apparatus according to the configuration of the present invention further includes a terminal information storage device that stores information transmitted from the transmission device.

According to this configuration, information can be compared between the terminal apparatus and a transmission destination, thereby facilitating subsequent check and verification work.

The information management system of the present invention includes a terminal apparatus communicably connected to a gaming machine in which a game can be played according to an inserted currency, and an information processing apparatus capable of communicating with the terminal apparatus, in which the terminal apparatus includes a control device that executes an insertion process for converting an amount of the inserted currency into an amount of a specific currency based on a conversion rate for converting the amount of the inserted currency into the amount of the specific currency and a transmission device that transmits inserted currency information including currency information representing the type of the inserted currency and rate information representing the conversion rate used for conversion by the control device, and the information processing apparatus includes a recording device that records the inserted currency information transmitted from the terminal apparatus.

According to this configuration, the type of the inserted currency and the conversion rate used at the time of conversion are transmitted from the terminal apparatus to the information processing apparatus, thereby making it possible to easily total sales, and the like in the information processing apparatus later.

In the information management system according to the configuration of the present invention, the transmission device transmits timing information representing the timing at which the insertion process is executed, together with the inserted currency information.

According to this configuration, the currency input time can be specified, thereby facilitating to verify a conversion result later based on the conversion rate at the time of inserting a certain currency.

The information processing system according to the configuration of the present invention further includes a terminal information storage device that stores information transmitted from the transmission device.

According to this configuration, information can be compared between the terminal apparatus and a transmission destination, thereby facilitating subsequent check and verification work.

In the information processing system according to the configuration of the present invention, the information processing apparatus includes a totaling device that totals the inserted currency information transmitted from the terminal apparatus and a fraud detection device that detects the presence or absence of fraudulent activity based on a totaled result by the totaling device and the rate information.

According to this configuration, the inserted currency information output from the terminal apparatus is accumulated and the presence or absence of fraudulent activity is detected based on the accumulated information, and thus, the presence or absence of fraudulent activity can be more easily detected than in the case of individually determining the presence or absence of the fraudulent activity.

The information management system of the present invention includes a terminal apparatus communicably connected to a gaming machine in which a game can be played according to an inserted currency, and an information processing apparatus capable of communicating with the terminal apparatus, in which the terminal apparatus includes a control device that executes an insertion process for converting an amount of the inserted currency into an amount of a specific currency based on a conversion rate for converting the amount of the inserted currency into the amount of the specific currency and a transmission device that transmits inserted currency information including currency information representing the type of the inserted currency and timing information representing the timing at which the insertion process is executed, and the information processing apparatus includes a recording device that records the timing information transmitted from the terminal apparatus.

According to this configuration, the type of the inserted currency and the timing information that specifies insertion time is output, thereby making it possible to easily total sales, and the like later.

The information management system according to the configuration of the present invention further includes a terminal information storage device that stores information transmitted from the transmission device.

According to this configuration, information can be compared between the terminal apparatus and a transmission destination, thereby facilitating subsequent check and verification work.

Advantageous Effects of Invention

According to the present invention, it is possible to provide a terminal apparatus and an information management system that can easily check sales later even if a failure or the like occurs.

BRIEF DESCRIPTION OF DRAWINGS

FIGS. 9A to 9D are schematic diagrams illustrating a stored state of a conversion rate, a betting amount table, and an amount display example;

FIG. 14 is a diagram illustrating information accumulated in the information processing apparatus;

FIG. 16 is a schematic diagram illustrating a display example of a lower image display panel.

DESCRIPTION OF EMBODIMENTS

A gaming machine as an information processing apparatus of the present invention will be described based on the drawings.

[Overall Configuration of Information Management System]

Figure 1A:
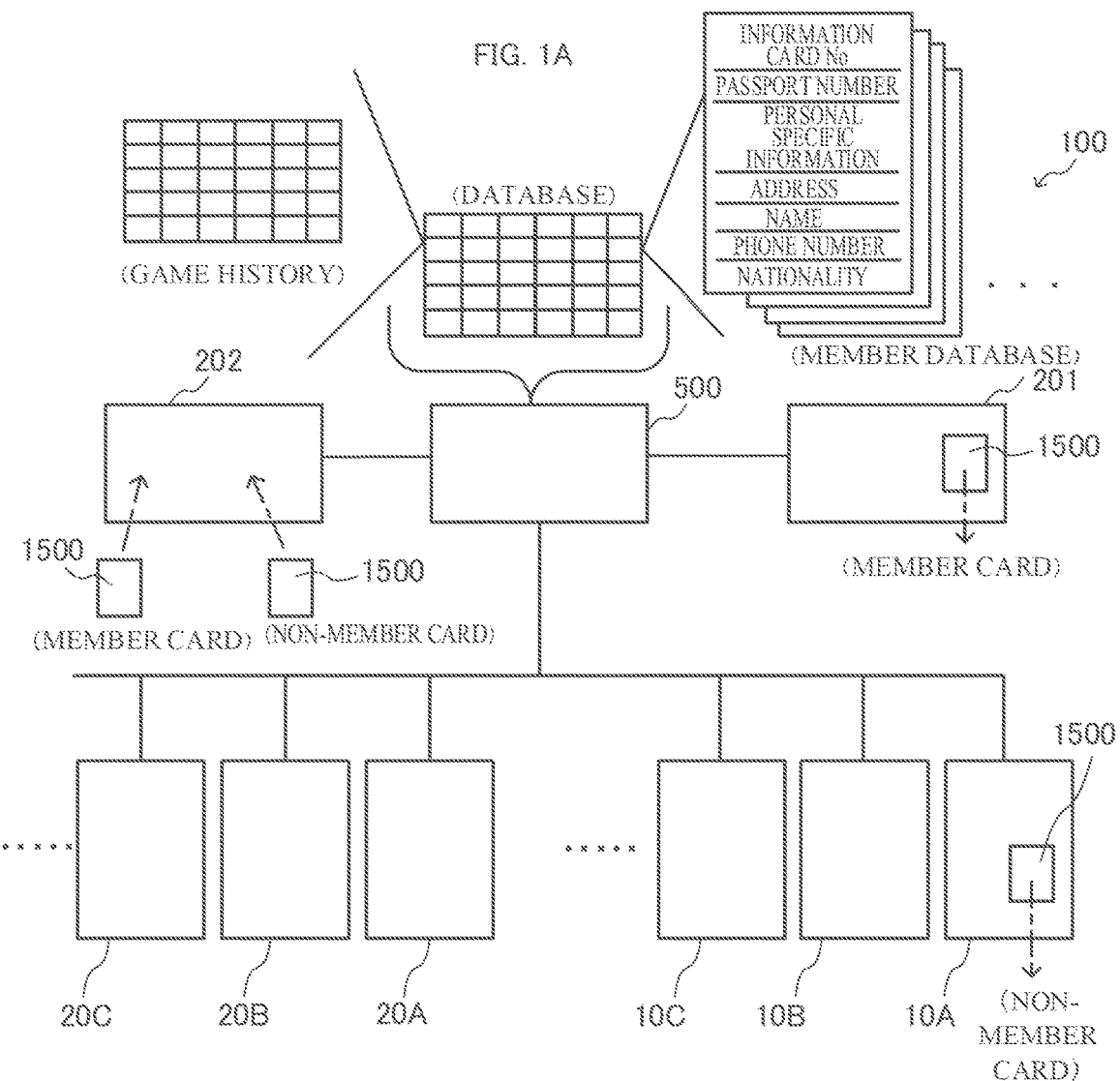
FIGS. 1A and 1B are block diagrams illustrating an overall configuration of an information management system.

FIG. 1A is a block diagram illustrating an information management system 100 according to an embodiment of the present invention. As illustrated in FIG. 1, the information management system 100 is configured with a plurality of gaming machines (for example, slot machines 10A, 10B, . . . ) that are installed in a game facility such as a casino, and an information processing apparatus 500 connected thereto so as to be capable of bidirectional communication. In this embodiment, communication between the slot machines 10A, 10B, . . . and the information processing apparatus 500 is performed by a PTS terminal 700 provided in respective slot machines 10A, 10B, . . . , but the slot machines 10A, 10B, . . . may directly communicate with the information processing apparatus 500.

A member information card issuing device 201 is connected to the information processing apparatus 500, and an IC card 1500 is issued as a member information card in the member information card issuing device 201. In this member information card, unique information card identification information (information card number (No)) for specifying the IC card 1500 is stored, and in the information processing apparatus 500, member information is accumulated in a member database in correlation with each information card number. The player who becomes a member registers personal information (for example, name, address, telephone number, nationality, passport number, personal identification information that specifies individuals issued by the government, and the like) as the member information in a member database, so that the personal information is registered in the member database in correlation with the information card identification information (information card number) for specifying the information card.

The information card to which this information card number is given is issued from the member information card issuing device 201 and is used when the player who has registered as a member plays a game in the slot machines 10A, 10B, . . . .

Further, the information processing apparatus 500 is connected with a cashier 202 for cash conversion based on the IC card 1500 (member information card and non-member information card). A player who has played a game by using the IC card 1500 as the member information card or the non-member information card (described later) inserts the IC card 1500 paid out from the slot machines 10A, 10B, . . . after the game into a card reading device of the cashier 202, so that a currency corresponding to the balance held by the player, which is correlated with the information card identification information (information card number) of the IC card 1500, is paid out to the player. In the case of this embodiment, information of the balance correlated with the information card (IC card) is directly written to the IC card 1500, but is not limited thereto and may be stored in the information management apparatus 500 in correlation with the information card number, for example. In this case, balance information stored in a memory of the information processing apparatus 500 corresponding to the card number of the IC card 1500 read by a card reading device of the cashier 202 may be read out and the currency may be paid back based on this.

The non-member information card (IC card 1500) is a card that allows a player who has not registered as a member to play a game by first inserting the currency into the slot machines 10A, 10B, . . . , in which an amount corresponding to the number of credits remaining after the BET is written with respect to the dividend awarded to the player as a result of the game and the inserted amount, thereby being newly paid out from the slot machines 10A, 10B, . . . where the play was performed. The player inserts this newly paid-out non-member information card into other slot machines 10A, 10B, . . . , and thus, can play a new game using the number of credits corresponding to the balance information written in the non-member information card. When a game is played by inserting the non-member information card (IC card 1500) into the slot machines 10A, 10B, . . . , a game value (currency amount, number of credits, and the like correspond to this) based on the number of credits such as a dividend awarded as a result of the game play is written in the non-member information card (IC card 1500) inserted in the slot machines 10A, 10B, . . . at the time of the game play. That is, the balance information of the non-member information card is updated and the non-member information card is paid out. With this, the player who has not registered as a member can play a game on the plurality of slot machines 10A, 10B, . . . while using the one non-member information card.

Even when the inserted IC card 1500 is a member information card issued to a player who is a registered member, the balance information is updated and paid out in the same manner with respect to the inserted member information card.

Table game devices 20A, 20B, . . . for playing a table game called a so-called casino table such as a baccarat game or a roulette game is connected to the information processing apparatus 500. When playing a card game, for example, the table game devices 20A, 20B, . . . have a game board, a card shoe, a dealer display, a chip tray, and a control unit for controlling these.

Figure 1B:
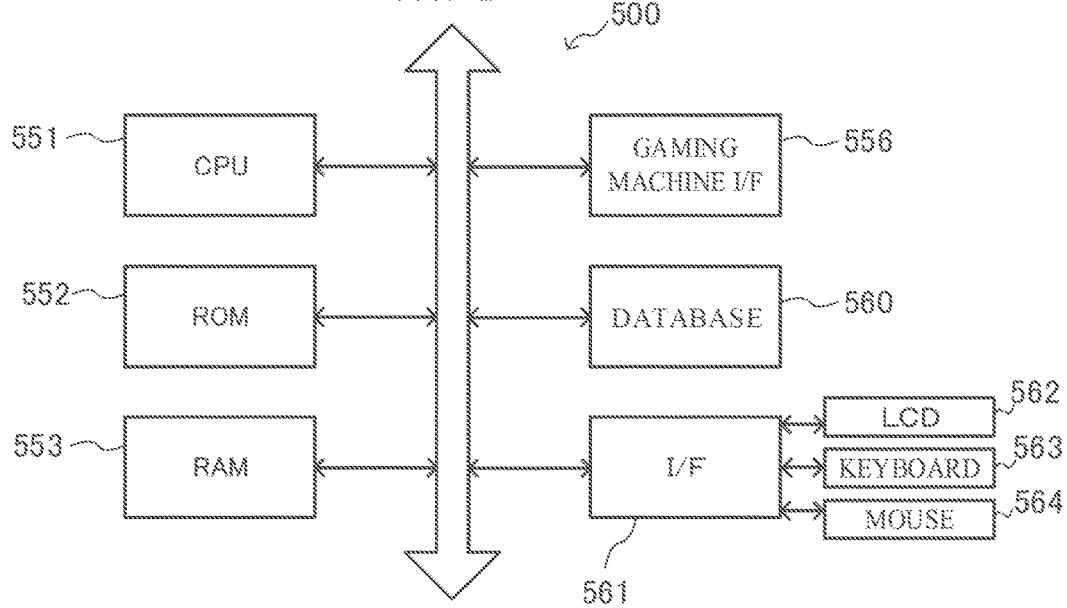

FIG. 1B is a block diagram illustrating the configuration of the information processing apparatus 500. As illustrated in FIG. 1B, the information processing apparatus 500 has a configuration in which a central processing unit (CPU) 551, a read only memory (ROM) 552, a random access memory (RAM) 553, a gaming machine I/F 556, a database 560, an I/F 561, a liquid crystal display (LCD) 562, a keyboard 563, a mouse 564, and the like are connected to a bus. In the database 560, member information correlated with the information card number, balance information, and game history information correlated with the IC card 1500 issued to the member, balance information, and game history information correlated with the IC card 1500 issued to a non-member are stored.

[Management System]

Figure 2:
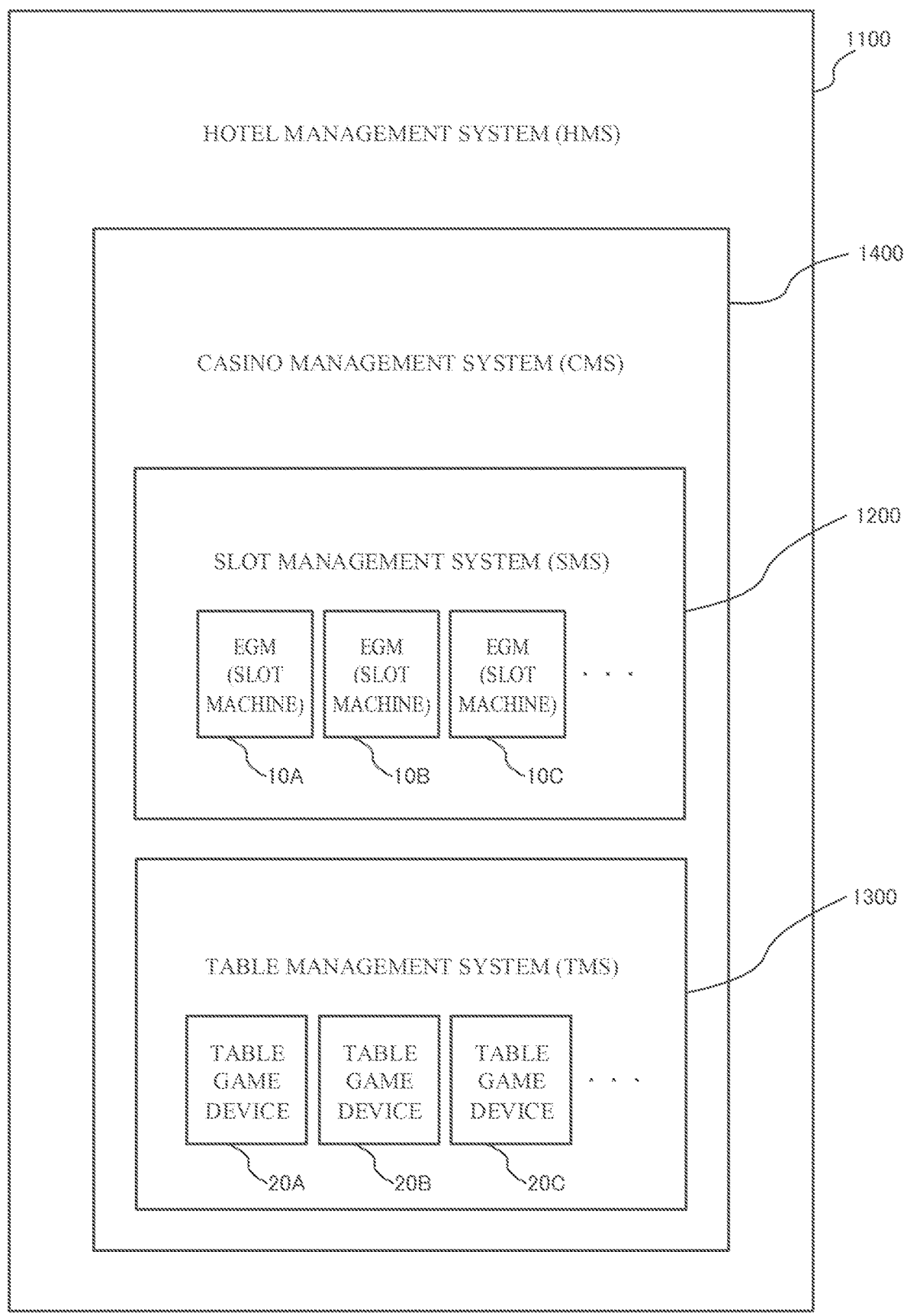
FIG. 2 is a schematic diagram illustrating a management system of the information management system.

FIG. 2 is a schematic diagram illustrating a hotel management system 1100 including the information management system 100 according to this embodiment.

As illustrated in FIG. 2, the hotel management system (HMS) 1100 is configured with a slot machine management system (SMS) 1200 for managing the slot machines 10A, 10B, . . . , a table management system (TMS) 1300 for managing the table game devices 20A, 20B, . . . , and a casino management system (CMS) 1400 for managing the SMS 1200 and the TMS 1300.

Each management system (HMS 1100, CMS 1400, SMS 1200, and TMS 1300) illustrated in FIG. 2 does not refer to a specific server or terminal apparatus, but performs a specific process by functionally combining various apparatuses such as a server and a terminal apparatus that construct the information management system according to the purpose.

FIG. 2 illustrates a case where the information management system 100 (FIG. 1) is applied to a casino system and shows a system for managing the slot machines (EGM) 10A, 10B, . . . and the table game devices 20A, 20B, . . . of FIGS. 1A and 1B by a two-step management layer (SMS 1200, TMS 1300, and CMS 1400).

Specifically, the slot machines 10A, 10B, . . . of the casino system are capable of executing slot games and are capable of displaying the exchange rate on the PTS terminal. On the other hand, the table game devices 20A, 20B, . . . can execute the table games such as the baccarat game and the roulette game. In the casino system, foreign currency conservation of the slot machines 10A, 10B, . . . is performed in four types of management departments. The four departments are a game technology service (GTS) department, an electronic game administration (EGO) department, a cage & count department, and a gaming audit department.

In the casino system, the CMS 1400 having a function as an exchange rate management device is arranged in an upper management layer and the SMS 1200 and TMS 1300 having a function as a relay device are arranged in a lower management layer. With this, the casino system can load the exchange rate stored in the CMS 1400 onto the slot machines 10A, 10B, . . . via the SMS 1200 and can store the update time of the exchange rate in the CMS 1400, the SMS 1200, and the slot machines 10A, 10B, . . . (specifically, the PTS terminal 700 provided in each slot machine 10A, 10B, . . . ).

The CMS 1400 has a function of totaling and managing the sales in the slot machines 10A, 10B, . . . and the table game devices 20A, 20B, . . . . The CMS 1400 has a function of storing the exchange rate and the update time of the exchange rate in an exchange rate storage table.

In the CMS 1400, a person who is a cage shift manager or higher is set as a person having a maintenance authority and this person maintains the daily exchange rate. In the CMS 1400, a person who is a cage shift manager or higher is set as a person having check authority, the daily exchange rates are integrated by this person, and it is checked that the exchange rates are correctly stored in the SMS 1200 and TMS 1300 of the lower management layer. In the CMS 1400, the exchange rate displayed on the foreign exchange rate display board is checked in the cage & count department.

The SMS 1200 arranged in the lower management layer has a function of totaling the sales of the slot machines 10A, 10B, . . . . The SMS 1200 may have a function of storing the exchange rate and the update time of the exchange rate in the exchange rate storage table. With this function, when only the slot machines 10A, 10B, . . . are installed, that is, when the slot machines 10A, 10B, . . . do not include the PTS terminal 700, the exchange rate and the update time in the slot machines 10A, 10B, . . . can be managed in the SMS 1200.

The TMS 1300 arranged in the same lower management layer as the SMS 1200 has a function of totaling the sales of the table game devices 20A, 20B, . . . . The TMS 1300 may have a function of storing the exchange rate and the update time of the exchange rate in the exchange rate storage table. With this function, the exchange rate and update time in the table game devices 20A, 20B, . . . can be managed in the TMS 1300.

In the SMS 1200 and TMS 1300, by an authorized employee of the GTS department who is a manager or higher, the currency setting is maintained and at least one of a game area and an EGM (slot machines 10A, 10B, . . . and the like) capable of receiving a non-settlement currency other than a settlement currency which is a base currency is maintained. Then, the SMS 1200 transmits and sets the currency setting to the PTS terminal 700 and causes the PTS terminal 700 to determine whether the denomination and the amount of money can be used and to determine whether the currency is the settlement currency (local currency) or the non-settlement currency (foreign currency).

For example, when the settlement currency (specific currency), which is the base currency, is the Philippine peso, a game area or EGM (slot machines 10A, 10B . . . and the like) in which US dollar, Hong Kong dollar, yen, and the like can be used as the non-settlement currency is set. With this, the PTS terminal 700 for which the currency is set by the SMS 1200 can manage the non-settlement currency (currency other than the specific currency) used in the EGM (slot machines 10A, 10B . . . and the like) by determining whether or not the bill is usable.

In the SMS 1200 and the TMS 1300, an authorized employee of the EGO department who is the operation manager or higher is set as "a person having check authority", the currency setting is checked by this person and at least one of the game area and EGM (slot machines 10A, 10B, . . . and the like) that can receive the non-settlement currency other than the settlement currency which is the base currency is checked. In the SMS 1200 and TMS 1300, the exchange rate is maintained and managed by the authorized employee of the EGO department.

Furthermore, an authorized employee of a gambling inspection department who is a gambling judge or above is set as a "person having check authority", a gambling audit procedure is executed by this person, and all bill (currency) transactions are guaranteed to be reported correctly on the SMS 1200 and the TMS 1300.

The "settlement currency (specific currency)" is a currency that can be used in the information management system of this embodiment without conversion at an exchange rate and the "non-settlement currency (currency other than the specific currency)" is a currency that needs to be converted into the settlement currency at the exchange rate. The exchange rate is output from an exchange rate output device of a bank and the like and can be visually checked by the operator.

As an example of a relationship between the settlement currency and the non-settlement currency, when the Philippine peso is the settlement currency (specific currency) among multiple currencies such as US dollar, Hong Kong dollar, Philippine peso, and Japanese yen, US dollar, Hong Kong dollar, and Japanese yen are non-settlement currencies. Specifically, when the settlement currency (specific currency) is the Philippine peso currency and the non-settlement currency is the US dollar currency, converted currency amount data indicating the amount (for example, 1 peso) of a settlement currency specified based on the amount (for example, 0.01 dollar) of the non-settlement currency and the exchange rate is transmitted to the PTS terminal 700 included in the EGM (slot machines 10A, 10B, . . . , and the like). In the exchange rate, the correspondence (for example, the correspondence of 1 peso=0.01 dollars) between the amount of settlement currency and the amount of non-settlement currency other than the settlement currency is determined for each type other than the non-settlement currency. With this, the exchange rate management system (information management system 100) can perform various types of processing using a plurality of different currencies such as a US currency and a Japanese currency. For that reason, even if the settlement currency in hand (for example, Philippine peso) is run out, the user can continue processing by using the currency (for example, the US currency or the Japanese currency) that he or she owns separately without having to bother exchanging money.

The information management system stores an exchange rate (conversion rate) updated at a predetermined timing. The "predetermined timing" means that, for example, if it is a bank opening day on a weekday, the exchange rate is updated to an exchange rate on the bank opening day on that day at any timing within a predetermined period such as from 10:00 am to 12:00 noon, and also means that if it is a bank holiday on Saturdays, Sundays, and holidays, the exchange rate is updated to an exchange rate on the last bank opening day. In the CMS 1400, for example, when the exchange rate is output from an exchange rate output device of the bank during business hours of the bank from 10:00 am to 12:00 noon, the operator updates the exchange rate in the CMS 1400 using a predetermined input device. In this case, the CMS 1400 stores the update time together with the update of the exchange rate in the storage unit of the CMS 1400.

After the exchange rate is updated in the CMS 1400, when the PTS terminal 700 is in a foreign currency reception prohibited state and the SMS 1200 is in an offline state, the operator inputs the updated exchange rate into the SMS 1200 using the input device based on the exchange rate displayed in the CMS 1400.

The SMS 1200 to which the exchange rate is input updates the exchange rate and records the update time. When the exchange rate and the update time are updated, the exchange rate is transmitted to (loaded on) the PTS terminal 700 of the corresponding EGM (slot machine 10A, 10B, . . . , and the like). With this, the PTS terminal 700 updates the exchange rate and records the update time.

After that, the operator of the electronic game management department checks the exchange rate of the SMS 1200 after the PTS terminal 700 becomes in a foreign currency reception permission state and the SMS 1200 becomes in an online state. Then, in the PTS terminal 700, when US dollar or Hong Kong dollar which is the foreign currency (non-settlement currency) is exchanged into the Philippine peso which is the settlement currency at the exchange rate, data of this foreign currency exchange and exchange time is transmitted to the SMS 1200 and recorded, and also recorded in the PTS terminal 700.

Figure 3:
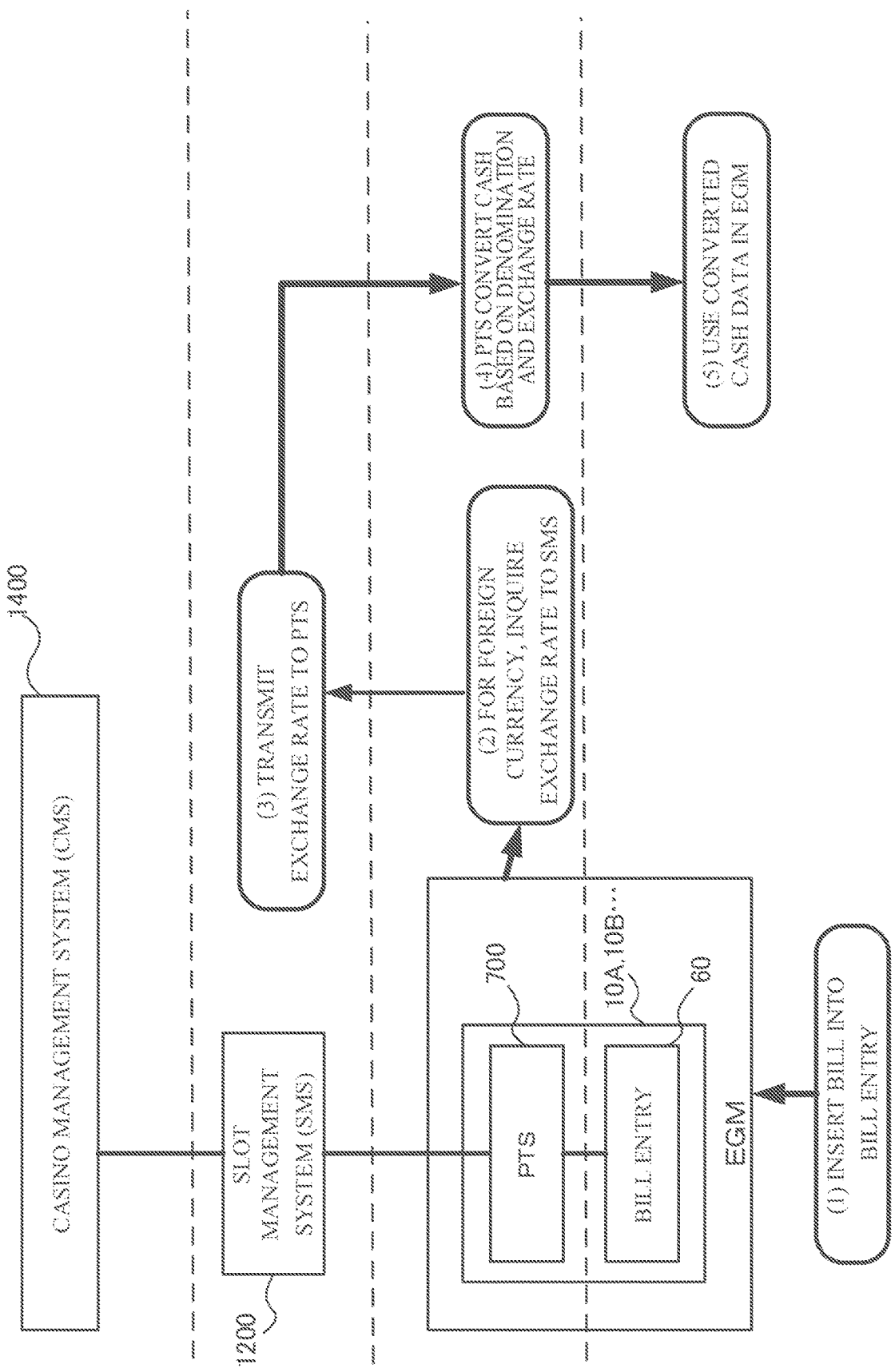
FIG. 3 is a schematic diagram illustrating a process when a bill is inserted.

As illustrated in FIG. 3, when the information management system 100 (casino system) configured as described above includes the slot machines 10A, 10B, . . . including the PTS terminal 700, the PTS terminal 700 executes cash conversion based on the currency type of the bill inserted into a bill entry 60 and the exchange rate. Specifically, as a result of inserting a bill into the bill entry 60 of the slot machines 10A, 10B, . . . and performing identification and authenticity determination, if the bill is a proper bill, an identification result indicating the currency type and amount of this bill is transmitted to the PTS terminal 700. The PTS terminal 700 determines whether or not the currency and the amount of money can be used and determines whether the currency is a settlement currency (local currency), which is a specific currency, or a non-settlement currency (foreign currency), which is a currency other than the specific currency.

When it is determined to be the settlement currency, the PTS terminal 700 enables the bill inserted into the bill entry 60 to be used in the slot machines 10A, 10B, . . . . When it is determined to be unusable, the PTS terminal 700 ejects the bill inserted into the bill entry 60 and returns the bill to the player. When it is determined to be the non-settlement currency, the PTS terminal 700 queries the SMS 1200 for the conversion rate.

The conversion rate request signal is transmitted from the PTS terminal 700 to the SMS 1200. The SMS 1200 transmits the exchange rate corresponding to the inserted currency to the PTS terminal 700. The PTS terminal 700 enables the non-settlement currency to be used in the slot machines 10A, 10B, . . . by a procedure of cash-converting the currency to the specific currency (settlement currency) based on the currency type and the exchange rate and transmitting cash-converted data to the gaming machine controller of the slot machines 10A, 10B, . . . .

[Overall Structure of Slot Machine]

The overall structure of the slot machine 10 will be described.

In the slot machine 10, bills, coins, medals, tokens, tickets with barcodes, and the like are adopted in addition to electronic valuable information such as electronic money, as the game values.

Figure 4:
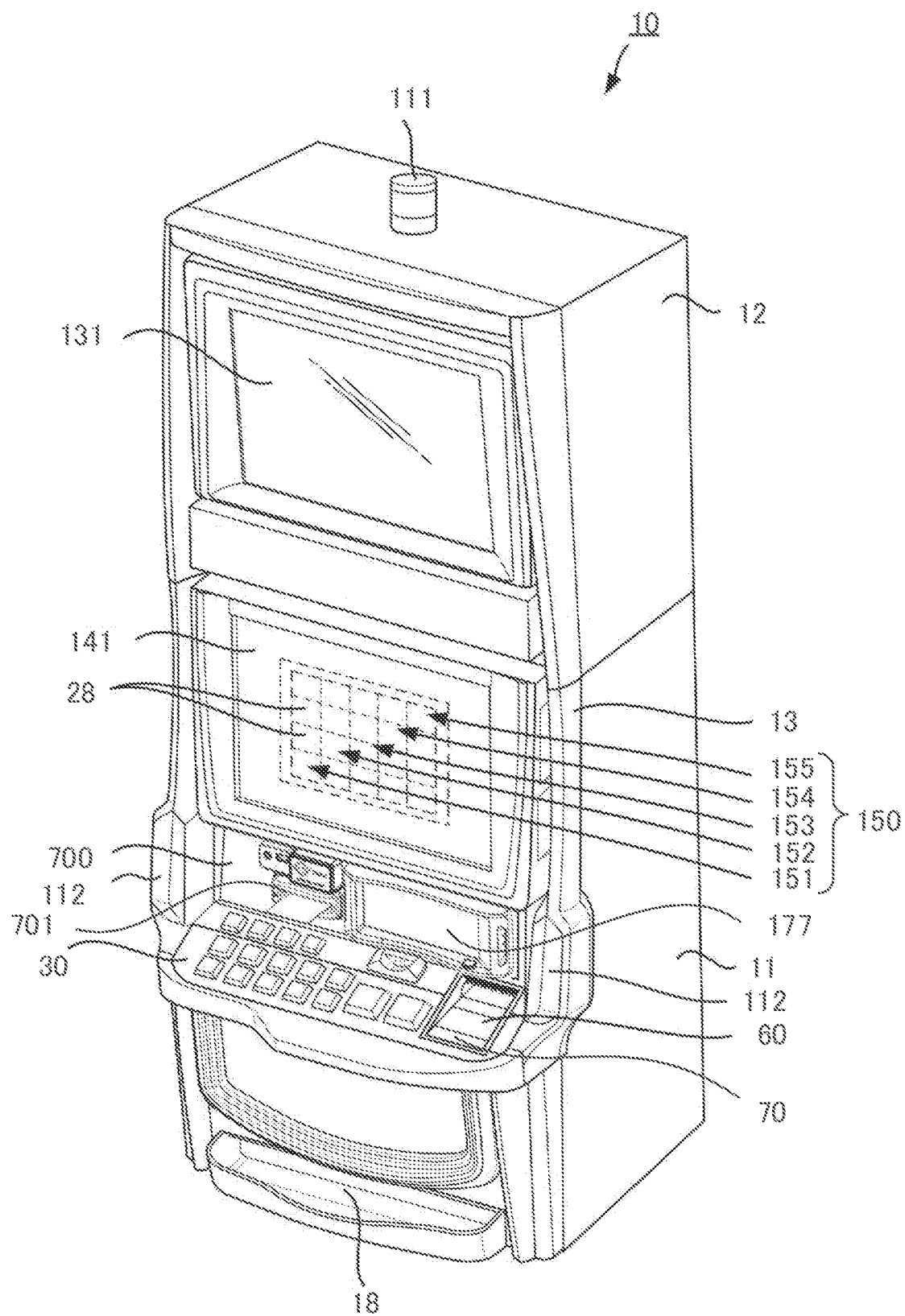
FIG. 4 is a perspective view illustrating an appearance of a slot machine.

As illustrated in FIG. 4, a lower image display panel 141 is provided in the center of the front surface of a casing 11 of the slot machine 10. The lower image display panel 141 is composed of a liquid crystal panel and configures a display. The lower image display panel 141 includes a symbol display region 150 for displaying images of a plurality of video reels 151 to 155. A lamp 112 used for performance is provided on a part of a front panel 13. Various notification lamps 111 are provided above the slot machine 10.

In this embodiment, the video reel represents motions of rotation and stop of a mechanical reel with a plurality of symbols drawn on its circumferential surface by a video in a pseudo manner. Symbol rows consisting of a plurality of symbols are assigned to the video reel.

In this embodiment, a video reel system for displaying a pseudo reel is adopted, but the slot machine 10 may be a system provided with a reel device of a mechanical reel system or may be a system in which the video reel and a mechanical system are mixed.

Above the lower image display panel 141, an upper image display panel 131 is provided on the front part of an upper casing 12. The upper image display panel 131 is composed of a liquid crystal panel and configures a display. On the upper image display panel 131, an image related to performance and an image illustrating an introduction of game contents and an explanation of the rule are displayed.

Below the lower image display panel 141, a control panel 30 having various buttons arranged therein, the PTS terminal 700 having a function as a conversion device, and the bill entry 60 are provided. In the embodiment of the present invention, as a management device that manages currency information (information such as currency unit, the amount represented by the currency unit, the number of credits corresponding to the amount) related to processing such as bet processing and dividend award in the slot machine 10 (game controller 70) as an information processing apparatus, the PTS terminal 700 and the bill entry 60 are included, but the concept of the management device may mean the PTS terminal 700 alone.

The bill entry 60 is for identifying whether or not a bill is valid and receiving a valid bill into the slot machine 10. The bill entry 60 is electrically connected to the PTS terminal 700 and transmits an input signal based on the amount of the bill to the PTS terminal 700 when receiving the valid bill. This input signal includes inserted currency information (for example, information "1 php") including a currency unit (Philippine peso: php (hereinafter, simply referred to as "peso" or "php"), dollar: usd, yen: jpy, and the like) of the inserted bill and the amount represented by this currency unit.

In this embodiment, there is a concept of currency information (for example, "1 php, 1 credit") in addition to the inserted currency information of the bill inserted into the bill entry 60. This currency information is a concept including a currency unit ("php (Philippine peso)", "usd (US dollar)", "jpy (yen)", and the like), amount information (for example, "1 php" and the like) represented by this currency unit, and the number of credits (for example, "1 php, 1 credit", and the like) corresponding to the amount information.

In the slot machine 10 of this embodiment, 1 credit, which is a unit of a game medium for playing a game, is correlated with an amount represented by "Philippine peso" as a specific currency, and as an example, currency information in which 1 credit is 1 php (Philippine peso) is set as base currency information. Specifically, the currency information is stored in a storage unit (not illustrated) of the game controller 70 as base currency information. The amount of money per credit (1 credit=1 Philippine peso) can be switched with a denomination button 47. As described above, in the slot machine 10 (game controller 70), the information that represents a specific currency (Philippine peso), as the currency unit to be handled when performing processing, is set as information that configures the currency information, and thus when the currency unit of the bill inserted into the bill entry 60 is a currency (for example, "US dollar") other than the specific currency, the PTS terminal 700 converts the currency into an amount in the specific currency (Philippine peso).

That is, the bill entry 60 has a function of identifying the currency type ("Philippine peso", "US dollar", "yen", and the like) and the amount for the inserted bill, and, for example, when a 1-dollar bill is inserted into the bill entry 60, the bill entry 60 transmits, to the PTS terminal 700, inserted currency information including currency unit information indicating that the currency unit of the inserted bill is "US dollar" and amount information indicating the amount of money (1 dollar). The PTS terminal 700 converts these pieces of information into "Philippine peso" which is a specific currency by reflecting the exchange rate. For example, when 1 US dollar bill is inserted, the PTS terminal 700 converts "US dollar" into "Philippine peso" based on the inserted currency information transmitted from the bill entry 60 and the exchange information (for example, 1 usd=51 php) at that time, and converts it into the currency information of "51 php". The currency information in the specific currency thus calculated is transmitted from the PTS terminal 700 to the game controller 70 (described later) of the slot machine 10.

In the case of this embodiment, the PTS terminal 700 acquires the exchange rate by regularly communicating with an external site and stores the acquired exchange rate in the storage unit of the PTS terminal 700, and conversion is performed using the latest exchange rate stored in the storage unit at the timing when the bill is inserted into the bill entry 60 by the player and the conversion is performed. The PTS terminal 700 acquires and stores the latest exchange rate for each preset time.

In the slot machine 10 (game controller 70), as the currency amount per credit, base currency information in the slot machine 10 is set to "Philippine peso", so that the game controller 70 converts the amount data into the number of credits, based on the converted amount data transmitted from the PTS terminal 700. For example, when 1 credit is set as 1 php (Philippine peso), the game controller 70 converts the amount data converted into Philippine peso and received from the PTS terminal 700 into the number of credits. Specifically, when, for example, the amount data of "51 php" as converted information indicating an inserted amount is transmitted from the PTS terminal 700, the game controller 70 obtains the number of credits of "51 credits" by converting the amount data of "51 php" into the number of credits according to the conversion rate of "1 credit=1 php", for example. The number of credits is stored in a storage unit (not illustrated) of the game controller 70 and is used to designate a number of BETs for playing the game. The player can play the game by betting on the control panel 30 within the range of the number of credits.

Although a fraction may occur depending on the result of conversion using the exchange rate in the PTS terminal 700, the game controller 70 stores the fraction in the storage unit and uses the fraction for a mini game or a donation described later.

In this embodiment, as described above, the amount in the inserted currency is converted into the specific currency ("Philippine peso" in this embodiment), which is set as base currency information in the slot machine 10, and also the conversion result is converted into the number of credits, so that, even if the player possesses a currency (for example, "US dollar") other than the currency ("Philippine peso" in this embodiment) capable of being handled in the slot machine 10, the player can play the game by directly inserting the US dollar bill into the bill entry 60 provided in the slot machine 10 (PTS terminal 700). With this, the game can be played without taking a complicated procedure of exchanging US dollar bills for Philippine peso bills at an exchange place different from the installation place of the slot machine 10.

The PTS terminal 700 includes a liquid crystal display (LCD) 177, and the LCD 177 has a touch panel on its display screen and has a function as a touch operation input unit of the player in addition to image display. It is a unit in which a human body detection camera 713, a microphone 715, a speaker 707, and the like are integrated. The human body detection camera can detect the presence or absence of a player by a camera function. The microphone is used by the player to participate in the game by voice and to authenticate the player by voice recognition. The PTS terminal 700 is provided with a card insertion slot 701, so that an IC card can be inserted. With this, the player can insert the IC card into the card insertion slot and use the credits stored in the IC card in the slot machine 10.

(Control Panel 30)

Figure 5:
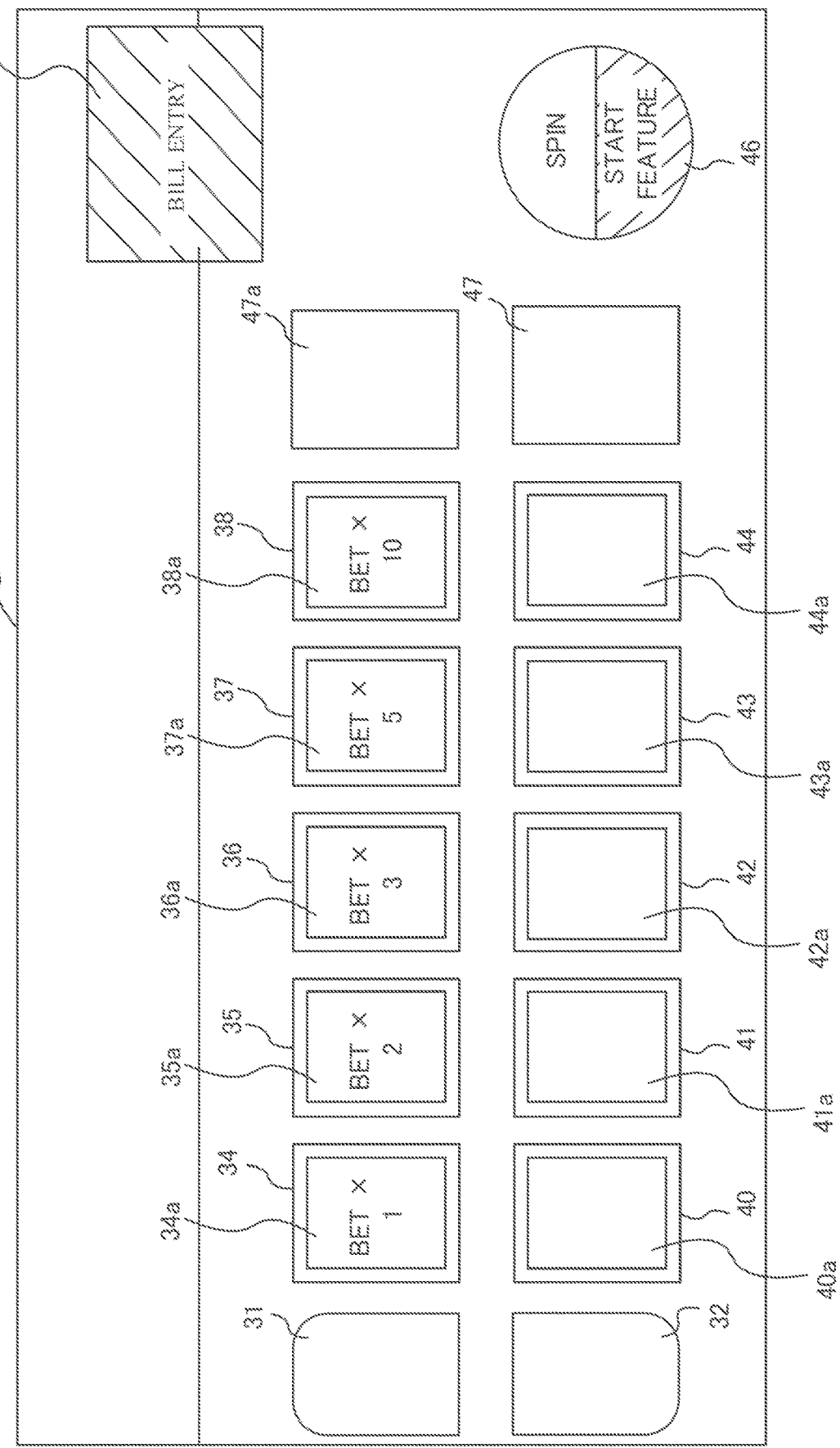
FIG. 5 is a plan view illustrating a configuration of a control panel.

As illustrated in FIG. 5, on the control panel 30, a CHANGE button 31 and a CASHOUT/TAKE WIN button 32 are disposed in the left region when facing, and a 1-BET button 34, a 2-BET button 35, a 3-BET button 36, 5-BET button 37, 10-BET button 38, a first credit button 40, a second credit button 41, a third credit button 42, a fourth credit button 43, and a fifth credit button 44 are arranged in the central region when facing. Further, the control panel 30 is provided with the bill entry 60 described above arranged in the upper stage of the right region when facing and a spin button 46 is arranged in the lower part of the right region. A denomination button 47 for switching the amount of money per credit is provided.

The CHANGE button 31 is an operation button used when leaving the seat or when requesting a staff member of a game facility to exchange money. The CASHOUT/TAKE WIN button 32 is an operation button used when clearing the credits deposited inside the slot machine 10.

The first credit button 40, the second credit button 41, the third credit button 42, the fourth credit button 43, and the fifth credit button 44 are buttons for deciding a region which is a target of winning determination (validation) from among 15 regions of 5 columns×3 rows of a symbol display region 150. The first credit button 40, the second credit button 41, the third credit button 42, the fourth credit button 43, and the fifth credit button 44 include display devices 40a, 41a, 42a, 43a, and 44a, respectively.

The display devices 40a, 41a, 42a, 43a, and 44a are liquid crystal devices provided on the upper surfaces of the first credit button 40, the second credit button 41, the third credit button 42, the fourth credit button 43, and the fifth credit button 44, respectively.

The 1-BET button 34, the 2-BET button 35, the 3-BET button 36, the 5-BET button 37, and the 10-BET button 38 are buttons for deciding a dividend rate for a base betting amount, as described above. The 1-BET button 34, the 2-BET button 35, the 3-BET button 36, the 5-BET button 37, and the 10-BET button 38 include display devices 34a, 35a, 36a, 37a, and 38a, respectively.

The display devices 34a, 35a, 36a, 37a, and 38a are liquid crystal devices provided on the upper surfaces of the 1-BET button 34, 2-BET button 35, 3-BET button 36, 5-BET button 37, and 10-BET button 38, respectively.

In this embodiment, the unit game is started by selecting a region pattern (selected from 5 levels of WAYS BET (WAYS BET1, WAYS BET2, WAYS BET3, WAYS BET4, and WAYS BET5)) of the symbol display region 150 that is the target of the winning determination, and the dividend (selected from 6 types of BET buttons (1-BET button 34, 2-BET button 35, 3-BET button 36, 5-BET button 37, and 10-BET button 38)) to determine the number of credits (betting amount) to bet.

For example, the value obtained by multiplying the credit (1 credit for WAYS BET1, 3 credits for WAYS BET2, 7 credits for WAYS BET3, 15 credits for WAYS BET4, and 25 credits for WAYS BET5) required for WAYS BET by a credit value corresponding to the BET button becomes the number of credits which is bet when starting the unit game.

For example, when the first credit button 40 correlated with "WAYS BET1" and the 2-BET button 35 are selected, "1"×"2"=2 credits are bet. When the third credit button 42 correlated with "WAYS BET3" and the 3-BET button 36 are selected, "7"×"3"=21 credits are bet. When the fifth credit button 44 correlated with "WAYS BET5" and the 10-BET button 38 are selected, "25"×"10"=250 credits are bet.

The spin button 46 is a button used when starting scrolling of the video reels. The spin button 46 is also a button used when selecting and deciding the options displayed on the lower image display panel 141.

The denomination button 47 is a button for changing the amount of money per credit, and a display device 47a configured with a liquid crystal device is provided adjacent to the denomination button 47. The amount of money per credit is displayed on the display device 47a. When the denomination changeover switch 47S is switched by operating the denomination button 47, the amount of money per credit displayed on the display device 47a is changed. That is, the player can change the amount of money per credit by operating the denomination button 47 while watching the display on the display device 47a. Incidentally, in the case of this embodiment, in the slot machine 10, currency information in which 1 credit is 1 Philippine peso is set as the base currency information, and by operating the denomination button 47, the player can change the amount of money per credit (amount in Philippine peso) by himself or herself.

The amount of money per credit displayed on the display device 47a is displayed in the amount of currency (for example, "US dollar") inserted by the player. Specifically, when the bill inserted into the bill entry 60 is, for example, "US dollar", the inserted currency information including the currency unit and the amount of the inserted bill is transmitted from the bill entry 60 to the PTS device 700. The PTS terminal 700 converts the inserted currency (for example, "US dollar") into Philippine peso set as a specific currency in the slot machine 10 and transmits the conversion result to the game controller 70 of the slot machine 10. Along with this, even if "Philippine peso" is set as the base currency information indicating the currency normally handled in the slot machine 10, the PTS terminal 700 transmits an amount of the inserted currency in a currency other than the currency (for example, "Philippines peso") is set as the base currency information, to the game controller 70 of the slot machine 10 as the inserted currency information. Specifically, when the inserted bill is one note of US dollar bill (one dollar bill), the PTS terminal 700 transmits, to the game controller 70 of the slot machine 10, information indicating that the type of inserted currency is "US dollar (usd)", information indicating that the inserted amount is 1 dollar (1 usd), and information indicating the result (for example, 51 Philippine pesos (51 php)) obtained by converting the inserted 1 dollar (1 usd) into "Philippine pesos" set as base currency information, as the inserted currency information.

Based on the inserted currency information transmitted from the PTS terminal 700, the game controller 70 of the slot machine 10 displays the amount in the inserted currency (for example, "US dollar") per credit on the display device 47a of the control panel 30 and the lower image display panel 141 (described later) of the slot machine 10 as the amount (for example, "1 credit=$0.01") reflecting the exchange rate at that time. Although this display control is displayed on the display device 47a and the lower image display panel 141 by the game controller 70 but is not limited thereto, and the display control may be displayed on the display device 47a and the lower image display panel 141 directly by the PTS terminal 700. By transmitting the inserted currency information from the bill entry 60 to the game controller 70 without passing through the PTS terminal 700, the amount of money per credit (the amount of money in the inserted currency (for example, US dollar)) may be calculated based on the exchange rate and the calculated amount may be displayed on the display device 47a and the lower image display panel 141 in the game controller 70.

In this way, although, in the control panel 30, the amount of money per credit converted into the type of currency inserted by the player is displayed, in the slot machine 10, by setting "Philippine Peso" as a specific currency, processing relating to betting and awarding of a prize according to the amount converted into "Philippine peso" which is a specific currency, as the amount of money per credit, is performed in the processing of the game controller 70 even if the bill inserted into the bill entry 60 is not a specific currency unit (for example, "Philippine peso").

That is, the player can set the amount per credit while watching the displayed amount converted into "US dollar" which is the currency inserted by himself or herself instead of the specific currency unit ("Philippine peso") handled by the slot machine 10, by operating the denomination button 47 while watching the displayed amount converted into "US dollar" on the display device 47a of the control panel 30. Specifically, when the denomination button 47 is sequentially pressed, the display on the display device 47a is sequentially changed in accordance with the button operation, such as "$0.01", "$0.1", . . . . The result of this change is transmitted from the control panel 30 to the PTS terminal 700. In the PTS terminal 700, the amount of money per credit (amount converted in US dollars) set by the denomination button 47 is converted into the amount of the specific currency (for example, "Philippine peso") handled in the slot machine 10, and the conversion result is transmitted to the game controller 70 (described later) of the slot machine 10. With this, in the game controller 70, betting processing and processing on awarding of a prize are performed according to the result (for example, 1 Philippine peso (php) per credit) of converting the amount of money per credit set by the player into the amount in the specific currency ("Philippine peso"). Regarding display for switching the denomination on the lower image display panel 141, a configuration in which the display and switching operation of the denomination button 47 can be performed in the same manner is adopted. Denomination display and switching on the lower image display panel 141 are controlled via the game controller 70 or directly from the PTS terminal 700.

(Function Description of Control Panel)

The control panel 30 of this embodiment includes the credit buttons 40, 41, 42, 43, and 44 (first credit button 40, second credit button 41, third credit button 42, fourth credit button 43, and fifth credit button 44) as a plurality of betting amount input devices for selecting a betting target. The credit buttons 40, 41, 42, 43, and 44 are respectively provided with the display devices 40a, 41a, 42a, 43a, and 44a that can be visually recognized from the outside, and different base betting amounts are set depending on the advantage.

The control panel 30 includes the bet buttons 34, 35, 36, 37 and 38 (1-BET button 34, 2-BET button 35, 3-BET button 36, 5-BET button 37, and 10-BET button 38) as a plurality of multiplier input devices for the player to select a dividend rate. The plurality of multiplier input devices are correlated with different dividend rates, respectively. The bet buttons 34, 35, 36, 37, and 38 are provided with the display devices 34a, 35a, 36a, 37a, and 38a which can be visually recognized from the outside to display the dividend rate.

When one of the credit buttons 40, 41, 42, 43, and 44 receives an input, the control panel 30 of the slot machine 10 displays a value obtained by multiplying the base betting amount set respectively by the dividend rates corresponding to the bet buttons 34 to 38 that have received the input, on the respective display devices 40a, 41a, 42a, 43a, and 44a of the credit buttons 40, 41, 42, 43, and 44. Further, on the display unit 40a, 41a, 42a, 43a, and 44a, the amount of money obtained by converting a value, which is obtained by multiplying the base betting amount by the dividend rate corresponding to the bet buttons 34 to 38 that have received the input, into a currency unit (for example, "US dollar") inserted by the player is displayed. For example, in FIG. 6A, when the 1-BET button 34 is operated, the display devices 40a, 41a, 42a, 43a, and 44a display 1, 3, 7, 15, and 25 credits, respectively, as the values obtained by multiplying the base betting amount set for each of the credit buttons 40, 41, 42, 43, and 44 by the dividend rates corresponding to the bet buttons 34 to 38 that have received the input, but in addition to this, display $0.01, $0.03, $0.07, $0.15, and $0.25 which are respective currency units. That is, a player who has inserted a bill of dollars into the bill entry 60 can see the amount converted and displayed in "dollar" as a currency unit on each of the credit buttons 40, 41, 42, 43, and 44. For example, regarding the display of 1, 3, 7, 15, and 25 credits respectively displayed as betting amounts on the display devices 40a, 41a, 42a, 43a, and 44a when the 1-BET button 34 is operated, the amount converted into "US dollar" which the player is accustomed to is displayed together with the credit display. Therefore, in a case where 1-BET is designated, when the player makes each bet of WAYS BET1, WAYS BET2, WAYS BET3, and WAYS BET4, and WAYS BET5 according to the display of respective display devices 40a, 41a, 42a, 43a, and 44a of the credit buttons 40, 41, 42, 43, and 44, the player can easily understand that 1, 3, 7, 15, and 25 credits are needed and these credits are equivalent to $0.01, $0.03, $0.07, $0.15, and $0.25 when converted into the currency unit of the inserted currency. Incidentally, if the bill inserted into the bill entry 60 is "Philippine peso", the amount converted into "Philippine peso" corresponding to each of the number of credits is displayed together with the symbol "php" representing the "Philippine peso".

Figure 6:
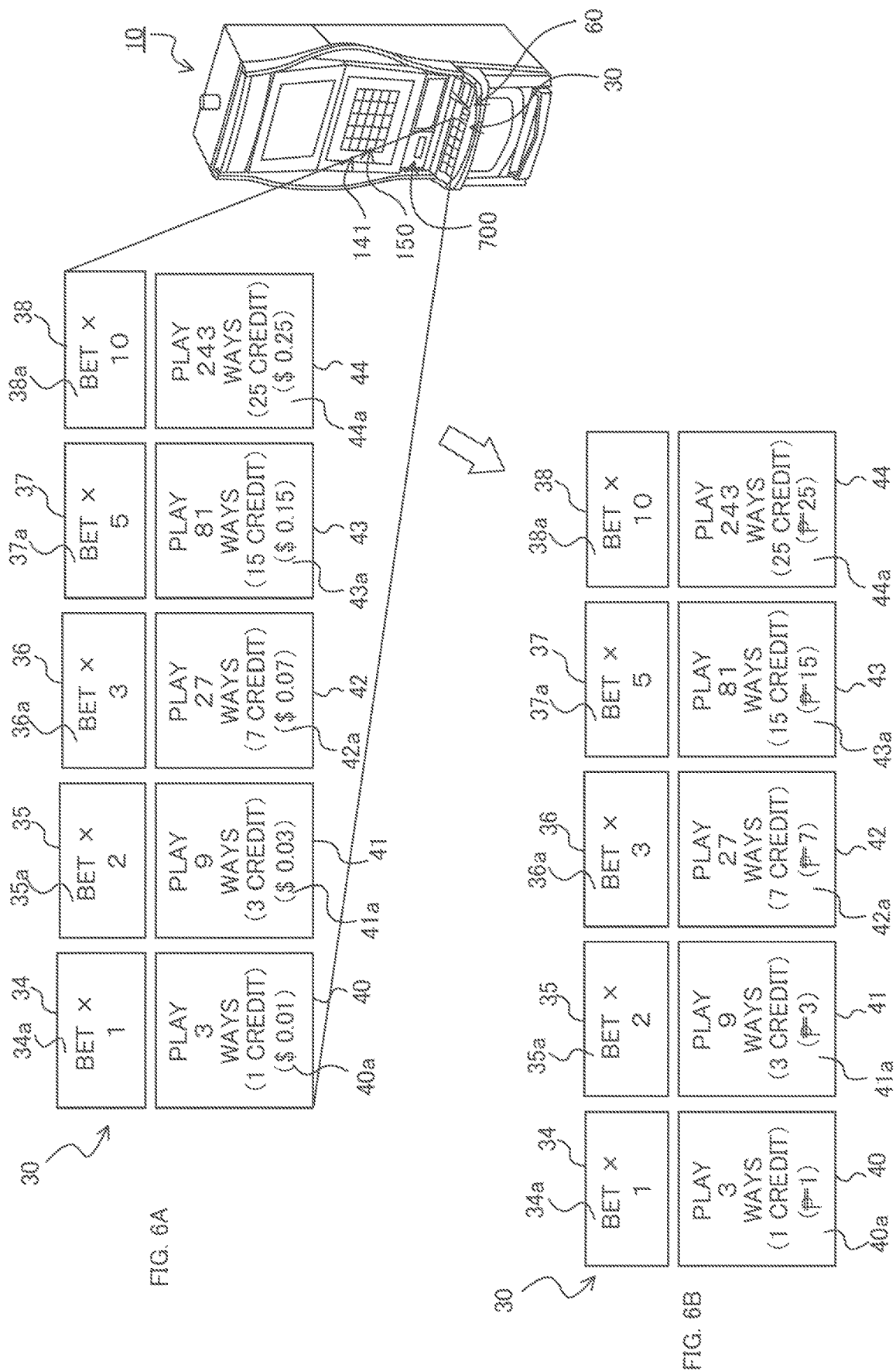
FIGS. 6A and 6B are plan views illustrating a configuration of the control panel.

Specifically, on the control panel 30 illustrated in FIG. 6A, in a state where the display contents of the display devices 40a to 44a are "PLAY 3 WAYS (1 CREDIT) ($0.01)", "PLAY 9 WAYS (3 CREDIT) ($0.03)", "PLAY 27 WAYS (7 CREDIT) ($0.07)", "PLAY 81 WAYS (15 CREDIT) ($0.15)", and "PLAY 243 WAYS (25 CREDIT) ($0.25)", respectively, when a bill whose currency unit is "Philippine peso" is inserted into the bill entry 60, the PTS terminal 700 transmits to the game controller 70 that the currency unit of the inserted currency is "Philippine peso" based on the inserted currency information output from the bill entry 60. Thus, the game controller 70 switches the display of each of the display devices 40a to 44a of the control panel 30 to information indicating that the currency unit is represented by "Philippine peso", via a display controller 170, as illustrated in FIG. 6B. That is, when the game controller 70 determines that the currency unit of the inserted bill is "Philippine peso", the game controller 70 switches the amount of money (amount of money corresponding to the number of credits) displayed on each of the display devices 40a to 44a of the control panel 30 from the display of the amount converted in the currency unit of "Dollar" so far to the display of the amount converted in the currency unit of "Philippine peso". Conversion between currency units is performed by the PTS terminal 700. In this case, the amount is displayed together with a symbol representing the currency unit "Philippine peso" (for example, a symbol with two horizontal lines added to "P"), or an image that can be correlated with "peso", or the like. Notation of the currency unit "Philippine peso" is not limited to the symbols illustrated on the display devices 40*a* to 44*a* in FIG. 6B, and, for example, various other notations can be used, such as a character representing a currency unit of "Philippine peso" such as "1 php" or a character representing a currency unit printed on a bill such as "1 PISO".

[Internal Configuration of Slot Machine]

Next, an internal configuration of the slot machine 10 and the control panel 30 provided in the slot machine 10 will be described with reference to FIG. 7.

The game controller 70 is provided on a game circuit board inside the slot machine 10. The display controller 170 is provided, inside a control panel, on a control panel circuit board different from the game circuit board of the game controller 70. The game controller 70 and the display controller 170 respectively includes a central processing unit (CPU), an electrically erasable and programmable read only memory (EEPROM) that stores programs executed by the CPU and data used for these programs to be rewritable, and a random access memory (RAM) that temporarily stores data during program execution, that are provided on the game circuit board and the control panel circuit board. The game controller 70 and the display controller 170 are constructed by the cooperation of these hardware and software in the storage device as described above. The display controller 170 is not limited to being provided separately from the game controller 70, and the game controller 70 may have the function of the display controller 170.

For example, in the storage device of the game controller 70, data and programs used when the CPU operates are stored. For example, the game controller 70 can store the game program, the game system program, and the authentication program described above when performing processing for loading these programs from an external storage device. The storage device of the game controller 70 is provided with a work area when the program described above is executed. For example, an area for storing the number of playing games, the number of BETs, the number of payouts, the number of credits, and the like, an area for storing symbols (code numbers) determined by lottery, and the like are provided.

As described above, the game controller 70 executes the game and controls the symbol display device 150 so that the symbols are rearranged according to the game. As described above, the game controller 70 validates the number of valid lines corresponding to the credit buttons 40, 41, 42, 43, and 44 that have received the input, in a display frame of 3 rows and 5 columns composed of a plurality of blocks, and when a predetermined number or more of the same type of symbols are rearranged in the validated valid lines, the game controller 70 awards a line dividend corresponding to the type of the symbol. That is, the game controller 70 is configured to control the slot machine by causing the CPU to execute the game program and the game system program in the storage device. The display controller 170 includes a graphic board and displays the required betting amount on the display devices 40*a*, 41*a*, 42*a*, 43*a*, and 44*a* of the credit buttons 40, 41, 42, 43, and 44.

The control panel 30 is provided with a CHANGE switch 31S, a CASHOUT switch 32S, a 1-BET switch 34S, a 2-BET switch 35S, a 3-BET switch 36S, a 5-BET switch 37S, a 10-BET switch 38S, a first credit switch 40S, a second credit switch 41S, a third credit switch 42S, a fourth credit switch 43S, a fifth credit switch 44S, a spin switch 46S, and a denomination changeover switch 47S corresponding to the buttons described above. Each switch detects that the corresponding button has been pressed by the player and outputs a signal to the game controller 70 and the display controller 170. The game controller 70 controls betting based on signals from the respective switches. The display controller 170 transmits the signals from the respective switches to the game controller 70 and the game controller 70 determines the contents to be displayed on the display devices 34*a* to 38*a* and 40*a* to 44*a* provided on the buttons 34 to 38 and 40 to 44 based on the signals and transmits the determination result to the display controller 170 to be displayed on each button.

The game controller 70 is connected to the graphic board 130, a power supply unit 81, and a communication interface 82, in addition to a speaker, a touch panel, and the like.

The graphic board 130 controls the display of images performed by each of the upper image display panel 131 and the lower image display panel 141 based on the control signal output from the game controller 70. The graphic board 130 includes a VDP that generates image data, a video RAM that stores image data generated by the VDP, and the like.

The graphic board 130 includes a video display processor (VDP) that generates image data based on a control signal output from the game controller 70, a video RAM that temporarily stores the image data generated by the VDP, and the like. The image data used when generating the image data by the VDP is included in the game program in the storage device. The graphic board 130 has a function of outputting the operation results of various touch icons provided on the lower image display panel 141 to the game controller 70.

The communication interface 82 is for communicating with the PTS terminal 700 and an external control device. When an input signal is received from the bill entry 60, the PTS terminal 70 transmits the inserted currency information included in the input signal to the game controller 70 via the communication interface 82. When the IC card is inserted into the card insertion slot, the PTS terminal 700 transmits the amount data stored in the IC card to the game controller 70 via the communication interface 82. The PTS terminal 700 writes the amount data to the IC card inserted into the card insertion slot, based on the control signal received from the game controller 70 via the communication interface 82.

The game controller 70 is capable of transmitting a signal to the display controller 170 using a known communication protocol and communication connection. For example, the game controller 70 transmits, to the display controller 170, a signal indicating whether or not various buttons are currently in the reception permitted state.

(Configuration of PTS Terminal)

Next, with reference to FIG. 8, a configuration of a circuit included in the PTS terminal 700 will be described.

A PTS controller 750 that controls the PTS terminal 700 includes a CPU 751, a ROM 752, and a RAM 753.

The CPU 751 controls the execution of each component of the PTS terminal 700 and also executes various programs stored in the ROM 752 or performs an operation.

The ROM 752 is composed of a memory device such as a flash memory and stores permanent data executed by the CPU 751. For example, in the ROM 752, a credit update program or the like for rewriting credit-related data (amount data) stored in an IC card (not illustrated) connected via an IC card interface (I/F) 763 may be stored.

The RAM 753 temporarily stores data necessary for executing various programs stored in the ROM 752.

An external storage device 754 is a storage device such as a hard disk device and stores a program executed by the CPU 751 and data used by the program executed by the CPU 751.

In this embodiment, the CPU 751 regularly acquires the latest exchange rate from the SMS 1200 and stores (updates) the latest exchange rate in the RAM 753 or the external storage device 754. This exchange rate is a conversion rate between a specific currency (for example, "Philippine peso"), which is predetermined, and other currencies (for example, "US dollar" and "yen") in the slot machines 10A, 10B, . . . and the table game devices 20A, 20B, . . . . The PTS terminal 700 may acquire the exchange rate from the SMS 1200 at any time when the PTS terminal 700 needs exchange rate information. Specifically, when the information representing the inserted currency is received from the bill entry 60 provided in the slot machines 10A, 10B, . . . , the conversion rate (exchange rate) between the inserted currency and the specific currency may be acquired from the SMS 1200 (information processing apparatus 500) each time.

A server interface (I/F) 755 realizes data communication between the PTS terminal 700 and the information processing apparatus 500 such as a hall management server, or another server. A gaming machine interface (I/F) 756 realizes data communication between the game controller 70 of the slot machine 10 and the PTS terminal 700 via the communication interface 82 (FIG. 7) of the slot machine 10, and a prescribed protocol may be used for the data communication.

In addition, the PTS terminal 700 is connected to the bill entry 60, which is a bill validator, through a bill entry interface (I/F) 757 and is also connected to a settlement machine (not illustrated) through a settlement machine interface (I/F) 758, thereby making it possible to transmit and receive data to and from these as needed.

An IC card control unit 741 controls insertion, ejection, writing of amount data, and the like, of the IC card. The IC card control unit 741 includes an IC card R/W (reader/writer) control unit, an IC card intake and ejection control unit, an LED control unit and the like.

A DSP 765 receives audio data acquired from the microphone 715, performs predetermined audio processing, and then transmits the data to the CPU 751. The DSP 765 also transmits the received audio data to the speaker 707. Furthermore, the DSP 765 outputs received audio to the headphone through the connected audio terminal of a headset, processes the audio received from the microphone, and transmits the processed audio to the CPU 751. Here, a schematic configuration is illustrated, and an A/D converter, a D/A converter, an amplifier, and the like are omitted.

A camera control unit 766 acquires an image of the player photographed by a human body detection camera 713, performs predetermined image processing as needed, and transmits the processed data to the CPU 751. The data is transmitted to the information processing apparatus 500 or the like via the server I/F 755, for example.

A ticket printer (not illustrated) is connected via a ticket printer I/F 759, and a ticket on which the payout amount printed is paid out from the ticket printer. This ticket is for cash conversion at a cashier (not illustrated) of the casino facility.

The LCD 177 is connected to the PTS terminal 700, and a touch panel is provided to the LCD 177 so that a touch operation of the player can be received.

(Data Table)

Figure 7:
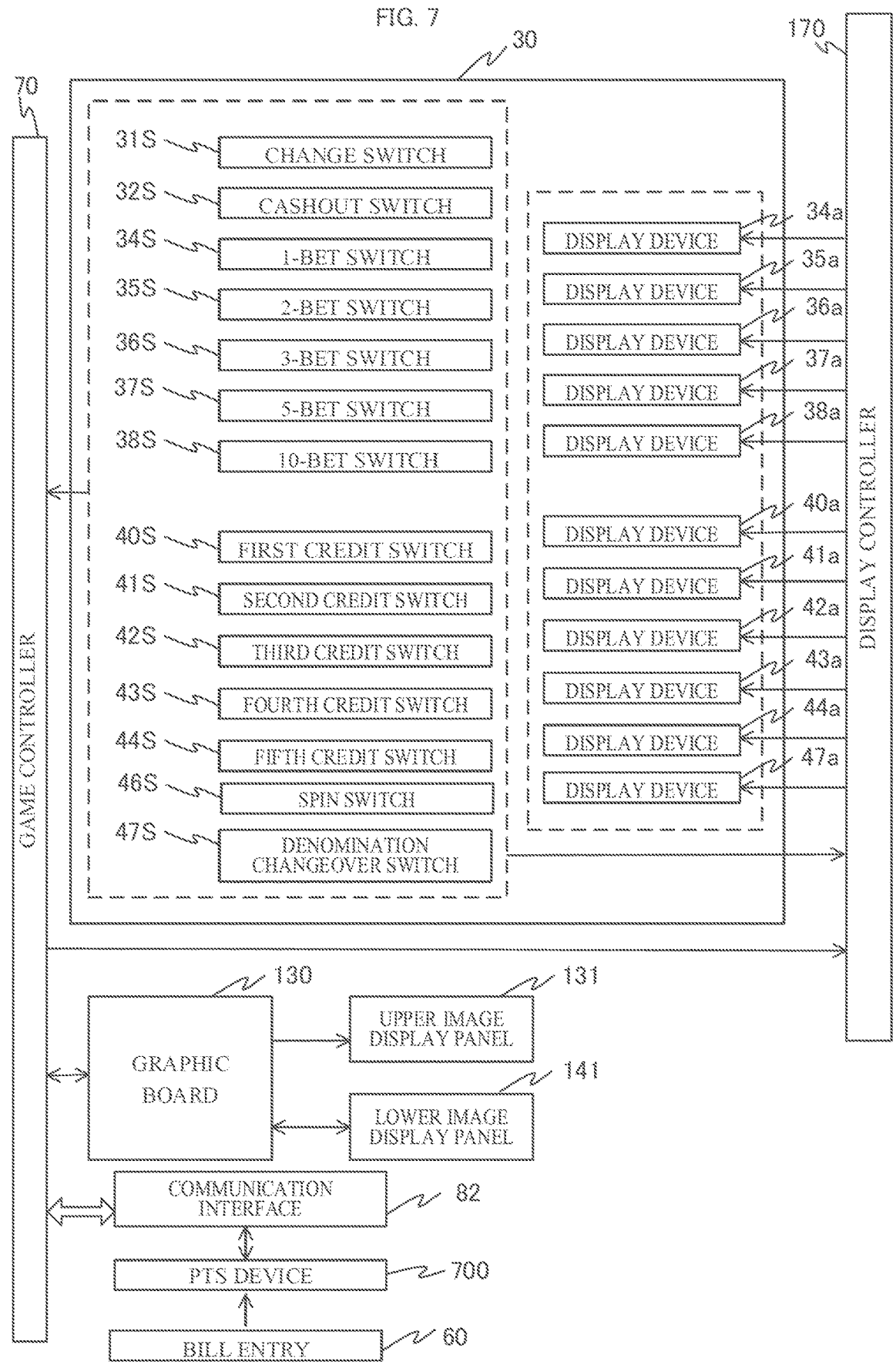
FIG. 7 is a block diagram illustrating internal configurations of the slot machine and the control panel.
Figure 8:
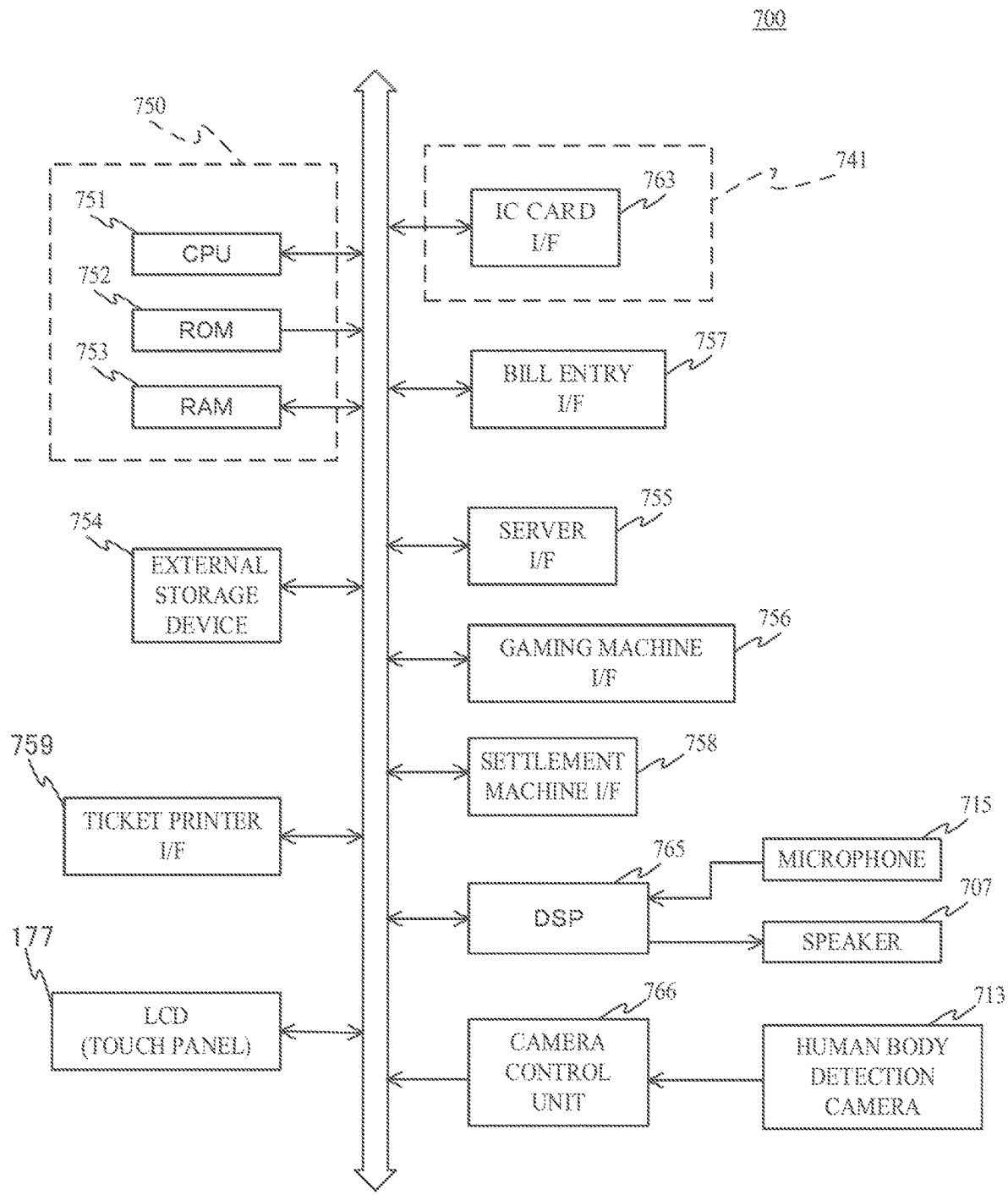
FIG. 8 is a block diagram illustrating a configuration of a PTS terminal.
Figures 9C, 9D:
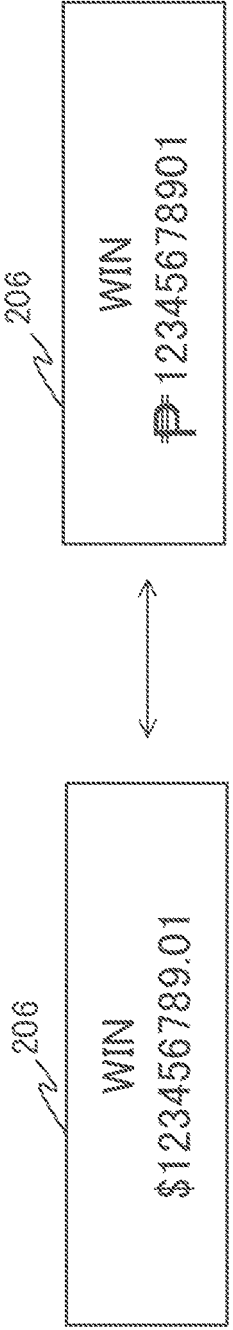

In the PTS terminal 700 illustrated in FIGS. 7 and 8, when a currency such as a bill is inserted into the bill entry 60, the inserted currency information (currency unit and amount) output from the bill entry 60 is stored in the RAM 753. As illustrated in FIG. 9A, in the storing region of the RAM 753, the conversion rate between the currency unit (for example, "US dollar") of the bill inserted by the player and the specific currency (for example, "Philippines peso") set in the slot machine 10 is stored. In FIGS. 9A to 9D, "US dollar" is simply expressed as "dollar" and "Philippine peso" is simply expressed as "peso".

When insertion information of a currency is received from the bill entry 60, the CPU 751 acquires the conversion rate between the corresponding currency (the inserted currency) and the specific currency from the RAM 753 or the external storage device 754. When the insertion information of the currency is received from the bill entry 60, the CPU 751 may acquire the latest exchange rate from the SMS 1200 (FIG. 2) and store the latest exchange rate in the RAM 753 or the external storage device 754 so that this exchange rate is used. When the inserted currency is "US dollar", the CPU 751 obtains the conversion rate between "US dollar" and "Philippine peso", which is the specific currency, from the RAM 753 and uses the conversion rate for conversion.

Therefore, in the PTS terminal 700, in response to a request from the game controller 70 of the slot machine 10, for example, the amount of money of the prize generated according to the progress of the game can be converted from the specific currency (for example, "Philippine peso") used in the processing of the slot machine 10 (game controller 70) into the currency unit (for example, "US dollar") of the bill inserted by the player at that time and the result can be replied to the game controller 70. The result (for example, the amount in "US dollars") converted in this way is displayed on the display panel (upper image display panel 131 and lower image display panel 141, or the like) of the slot machine 10. That is, in the slot machine 10 that performs processing of a game in the specific currency (for example, "Philippine peso"), the amount of money of the prize and the like generated during the progress of the game can be displayed in the amount converted into the currency type (for example, "US dollar") inserted by the player, and the amount can be displayed in the currency that the player is familiar with.

The game controller 70 illustrated in FIG. 7 includes a betting amount table in which the credit buttons 40, 41, 42, 43, and 44 and the bet buttons 34, 35, 36, 37, and 38 are correlated with each other in the storage device of the game controller.

As illustrated in FIGS. 9B and 9C, in the betting amount table, betting amounts correlated with a plurality of dividend rates (1-BET, 2-BET, 3-BET, 5-BET, and 10-BET) and a plurality of base bets (3 WAYS, 9 WAYS, 27 WAYS, 81 WAYS, and 243 WAYS) are stored.

For example, when the second credit button 41 receives an input, the respective credit numbers (2, 6, 14, 30, and 50) of the 2-BET row are displayed on the display devices 40a, 41a, 42a, 43a, and 44a, respectively.

Further, in each betting amount stored in the betting amount tables illustrated in FIGS. 9B and 9C, a currency amount corresponding to each betting amount is stored in correlation with each other. For example, if the specific currency preset in the slot machine 10 is "Philippine peso", the currency amount includes specific currency information such as the amount of money (for example, 1 credit is 1 peso) represented by the currency of "Philippine peso" per credit. In the betting amount table, the relationship (for example, 1 credit is $0.01) between the currency (for example, "dollar") other than the specific currency and the credit is stored as other currency information (currency information including currencies other than the specific currency). This table is rewritten regularly in order to reflect the exchange rate at that time. In FIGS. 9B and 9C, although the relationship between "Philippine peso" and "US dollar" and credits is tabulated, other currency types are also properly incorporated and tabulated. The betting amount table illustrated in FIGS. 9B and 9C may be stored in another device, for example, the PTS terminal 700 or the display controller 170, instead of the game controller 70.

[Contents of Program]

Next, a program executed by the game controller 70 of the slot machine 10 will be described.

(Main Control Process)

Figure 10:
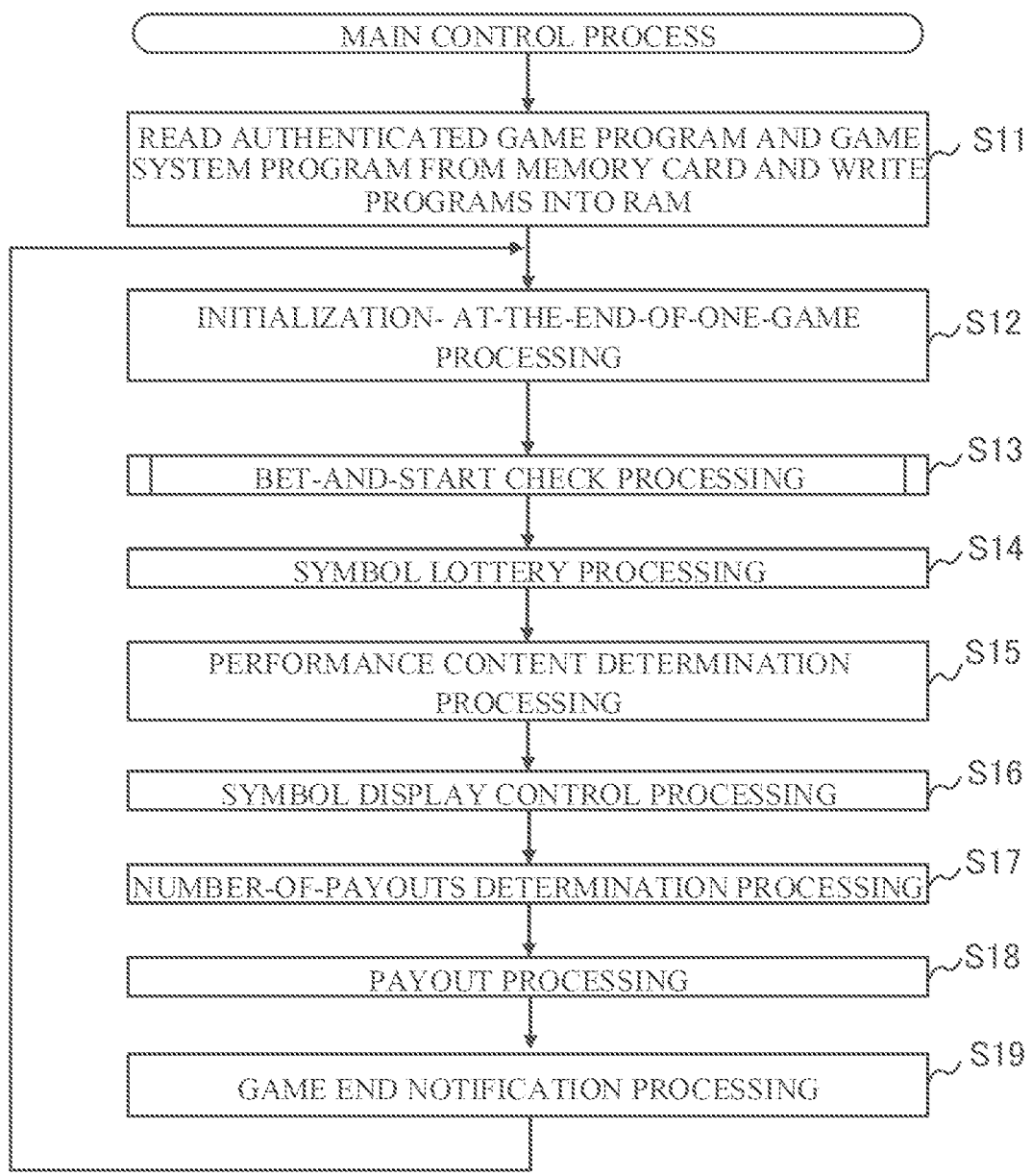
FIG. 10 is a flowchart illustrating a main control process.

First, a main control process will be described with reference to FIG. 10.

First, when the slot machine 10 is powered on, the game controller 70 reads the game program and the game system program and writes the program into the RAM (S11).

Next, in order to start the game, the game controller 70 performs initialization-at-the-end-of-one-game processing (S12). For example, unnecessary data, such as the bet number and symbols determined by lottery, is cleared for each game in a normal mode in the work area of the RAM.

Next, the game controller 70 performs bet-and-start check processing (S13). In this processing, the inputs of the 1-BET switch 34S, the 2-BET switch 35S, the 3-BET switch 36S, the 5-BET switch 37S, the 10-BET switch 38S, the first credit switch 40S, the second credit switch 41S, the third credit switch 42S, the fourth credit switch 43S, the fifth credit switch 44S, the spin switch 46S, the denomination changeover switch 47S, and the like are checked. When a player has inserted a bill into the bill entry 60 and the insertion information indicating that a new bill has been inserted from the PTS terminal 700 is received, the game controller 70 updates specific currency information (amount represented by the specific currency "Philippine peso" and the number of credits corresponding to this amount of money) for the player to play the game, which is stored in the game controller 70, in this bet-and-start check processing (S13). Specifically, the specific currency information converted from the amount of the newly inserted bill is added to the specific currency information already stored in the storage unit. That is, the slot machine 10 is configured such that game processing (a bet, dividend calculation, payout, and the like) is performed in a specific currency (for example, "Philippine peso"), and in the game controller 70, the bill inserted by the player and the amount of money awarded as a result of the game are managed as the specific currency information in the specific currency.

When a bill of the specific currency (for example, "Philippine peso") is inserted into the bill entry 60, the amount in the inserted specific currency (for example, "Philippine peso") and the number of credits corresponding to the amount of money are stored in the storage unit of the game controller 70. When specific currency information for the player to play the game is already stored in the storage unit of the game controller 70, "storing" here is a concept including the processing of adding the specific currency information to the amount of money and the number of credits of the currency information. These pieces of information may be stored in the storage unit of the PTS terminal 700.

In contrast, when the currency unit of the newly inserted bill is different from the specific currency (for example, when "US dollar" is inserted), specific currency information as a result of converting the inserted amount in the inserted currency unit to the amount represented in the specific currency (for example, "Philippine peso") is stored in the storage unit of the game controller 70. This conversion is executed by the PTS terminal 700, and the conversion result is transmitted from the PTS terminal 700 to the game controller 70 to be stored.

In this way, when the bill is inserted into the bill entry 60, after updating the specific currency information for playing the game stored in the game controller 70 based on the amount of the bill inserted at that time, the inputs of the 1-BET switch 34S, the 2-BET switch 35S, the 3-BET switch 36S, the 5-BET switch 37S, the 10-BET switch 38S, the first credit switch 40S, the second credit switch 41S, the third credit switch 42S, the fourth switch 43S, the fifth credit switch 44S, the spin switch 46S, and the like are checked.

Next, the game controller 70 performs symbol lottery processing (S14). In this processing, the symbol to be displayed in the middle region of the symbol display region 150 is determined as a stop scheduled symbol, from the plurality of symbols arranged on the video reels. Therefore, 15 symbols to be displayed in the symbol display region 150 (region in an upper stage, region in a middle stage, region in a lower stage) are determined.

Then, the game controller 70 stores the determined stop scheduled symbols in the symbol storing region provided in the RAM.

Next, the game controller 70 performs performance content determination processing (S15). The game controller 70 extracts a random number value for performance and determines any one of a plurality of predetermined performance contents by lottery.

Next, the game controller 70 performs symbol display control processing (S16). In this symbol display control processing, scrolling of the video reels is started, and after a predetermined time is elapsed, the stop scheduled symbols determined in the symbol lottery processing in the normal mode of S14 are sequentially stopped in the middle stage of the symbol display region 150. That is, 15 symbols including the stop scheduled symbols are rearranged in the symbol display region 150. That is, the symbols corresponding to the code numbers before and after the stop scheduled symbols are rearranged in the upper and lower stages of the symbol display region 150.

Next, the game controller 70 performs number-of-payouts determination processing (S17). In this processing, based on the symbol combination table stored in the RAM, it is determined whether or not the winning is achieved by connecting the same type of symbols from the first row region to the fifth row region by a predetermined number in the region that is the target of winning determination by WAYS BET in the symbol display region 150. Then, depending on the value (bet credit type) of the prize and the number-of-BETs counter, a privilege such as a dividend or an execution right of a free game is awarded. The awarded dividend is stored in the number-of-payouts storing region provided in the RAM.

Next, payout processing is performed (S18). The game controller 70 adds the value stored in the number-of-payouts storing region to the value of the credit number counter provided in the RAM. Here, for example, when the player presses the CASHOUT button 32 of the control panel 30, the CASHOUT switch (not illustrated) that detects this outputs a signal to a main CPU (not illustrated) of the game controller 70, and the main CPU converts the value of the credit number counter into the specific currency (for example, "Philippine peso") used in the slot machine 10. Then, a payout command is transmitted from the game controller 70 to the PTS terminal 700 together with the conversion result (payout amount represented by the specific currency), so that the amount stored as possession money in the IC card stored in the IC card control unit 741 of the PTS terminal 700 is updated. Alternatively, the value of the credit number counter is written in an unused IC card prepared in advance in a card stacker (not illustrated) provided in the IC card control unit 741, and the IC card is paid out.

Based on the input of the CASHOUT button 32, a ticket for cash exchange with the cashier can be issued from the PTS terminal 700. A ticket printer (not illustrated) is connected to the PTS terminal 700 via the ticket printer I/F 759 (FIG. 7), and when the IC card is not inserted, a ticket with the payout amount printed is paid out from the ticket printer. In the PTS terminal 700, the player can select and designate the payout currency, and the currency is converted into a currency unit designated by the player and written into an IC card or output to the ticket printer. The ticket printer may be connected to the slot machine 10.

Next, a main CPU 1071 performs game end notification processing (S19). This processing is the processing of transmitting data indicating that one unit game has ended to the PTS terminal 700. The PTS terminal 700 transmits this data to the information processing apparatus 500, and the lottery or the like for a bonus game is performed in response to this. When the processing of S19 is ended, the processing returns to S12, and the unit game is repeated.

(Currency Insertion Process)

Figure 11:
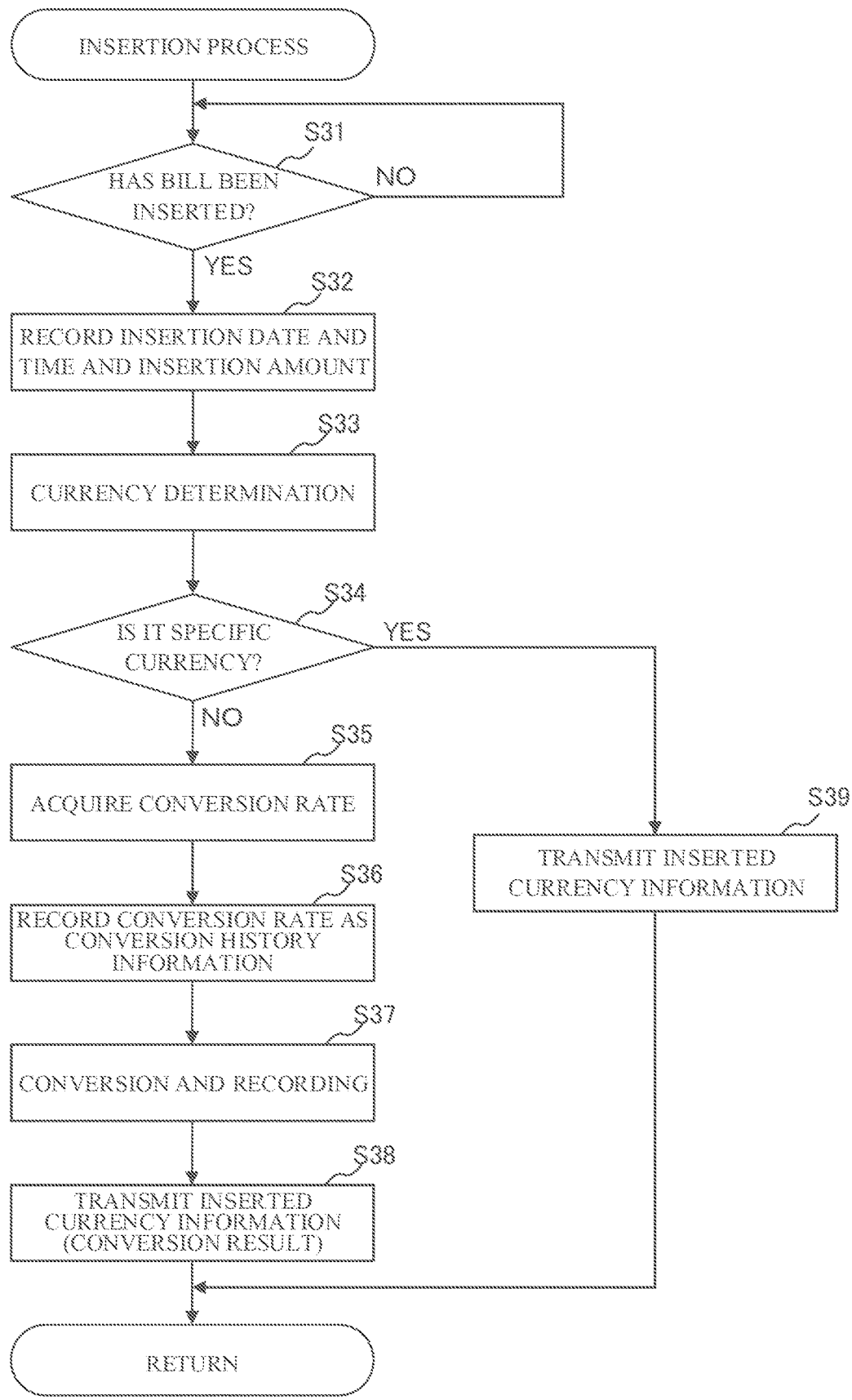
FIG. 11 is a flowchart illustrating an insertion process.

FIG. 11 is a flowchart illustrating a currency insertion process in the PTS terminal 700.

In the currency insertion process, the CPU 751 of the PTS terminal 700 waits for reception of information indicating that a bill has been inserted from the bill entry 60 (S31). When the player inserts a bill into the bill entry 60, the inserted currency information is transmitted from the bill entry 60 to the PTS terminal 700, so that the CPU 751 determines that the bill has been inserted when the information is received (YES in S31).

When it is determined that the bill has been inserted, the CPU 751 stores the date and time (insertion date and time) and an insertion amount at that time in the RAM 753 (S32). Although the insertion date and time are acquired by the CPU 751 by a clock (not illustrated) provided in the PTS terminal 700, instead of this, when the bill entry 60 includes a clock, the bill entry 60 may determine the date and time when the bill is inserted by the clock included in the bill entry 60 and the date and time in the state of being included in the inserted currency information may be transmitted from the bill entry 60 to the PTS terminal 700.

The insertion amount of bills inserted into the bill entry 60 is determined by a bill validation unit provided in the bill entry 60. That is, the bill entry 60 transmits the type and the insertion amount of inserted currency determined by the bill validation unit in the state of being included in the inserted currency information to the PTS terminal 700.

Therefore, in the PTS terminal 700, the type and amount of the inserted currency can be read from the inserted currency information transmitted from the bill entry 60 to be stored in the RAM 753 (S32).

The CPU 751 of the PTS terminal 700 determines the inserted currency based on information indicating the type of inserted currency stored in the RAM 753 in step S32 (S33), and, based on the determination result, determines whether the inserted currency is the specific currency (for example, "Philippine peso") set in the slot machine 10 (S34).

When it is determined that the inserted currency is the specific currency (YES in S34), the CPU 751 transmits the inserted currency information to the slot machine 10 without conversion (S39). In contrast, when it is determined that the inserted currency is not the specific currency (NO in S34), the CPU 751 acquires a conversion rate (exchange rate) for converting the inserted currency into the specific currency (for example, "Philippine peso") based on the type of currency and the insertion amount included in the inserted currency information, from the RAM 753 or the external storage device 74 (S35), and stores the acquired conversion rate in the RAM 753 as conversion history information associated with the information indicating the insertion date and time and the insertion amount stored in the RAM 753 in step S32 described above (S36).

Furthermore, the CPU 751 converts the amount of the inserted currency into the specific currency (for example, "Philippine peso") at the acquired conversion rate, and stores the conversion result as conversion result information in the RAM 753 in correlation with the conversion history information stored in the RAM 753 in step S36 described above (S37). With this, in the RAM 753, the currency type (US dollar, yen, Philippine peso, and the like) of the bills inserted into the bill entry 60, the amount in the inserted currency, the conversion rate (exchange rate) at the time of insertion, the amount of the result converted to the specific currency (for example, "Philippine peso") at the conversion rate at the time of insertion, the date and time at the time of conversion (at the time of insertion) are stored in association with each other. In the case of this embodiment, although the latest exchange rate is acquired from the outside and is stored in the CMS 1400 (information processing apparatus 500), the date and time when the exchange rate is stored (acquisition date and time information) is stored in the CMS 1400 together with information indicating the exchange rate, and after that, the information indicating the exchange rate is paired with acquisition date and time information of the exchange rate and stored in the SMS 1200 and the RAM 753 of the PTS terminal 700 or the like. As a result, when information of the exchange rate is read, the acquisition date and time information of the exchange rate can be acquired. The acquisition date and time information may be stored in the storage unit of the CMS 1400 and SMS 1200 or the RAM 753 of the PTS terminal 700 as information independent of information of the exchange rate.

Then, the CPU 751 transmits conversion results (currency types of bills inserted into bill entry 60 (US dollar, yen, Philippine peso, and the like), the amount in the inserted currency, the conversion rate (exchange rate) at the time of insertion, the amount resulting from conversion to the specific currency (for example, "Philippine peso") at the conversion rate at the time of insertion, and the date and time at the time of conversion (at the time of insertion)) of these pieces of information stored in the RAM 753 to the slot machine 10 and the SMS 1200 (information processing apparatus 500) as inserted currency information (S38).

By executing the insertion process described above, even if the bill inserted into the bill entry 60 is a currency other than the specific currency (for example, "Philippine peso") used in the slot machine 10, the PTS terminal 700 can convert the inserted currency into the specific currency at the conversion rate at that time and transmit the converted specific currency to the slot machine 10. In this case, the currency type of bills inserted into the bill entry 60 (US dollar, yen, Philippine peso, and the like), the amount in the inserted currency, the conversion rate (exchange rate) at the time of insertion, the amount resulting from conversion to the specific currency (for example, "Philippine peso") at the conversion rate at the time of insertion, and the date and time at the time of conversion (at the time of insertion) are stored in the RAM 753 of the PTS terminal 700 and the SMS 1200 (information processing apparatus 500) in correlation with each other, so that the sales can be easily totaled based on the stored information.

(Payout Process)

Figure 12:
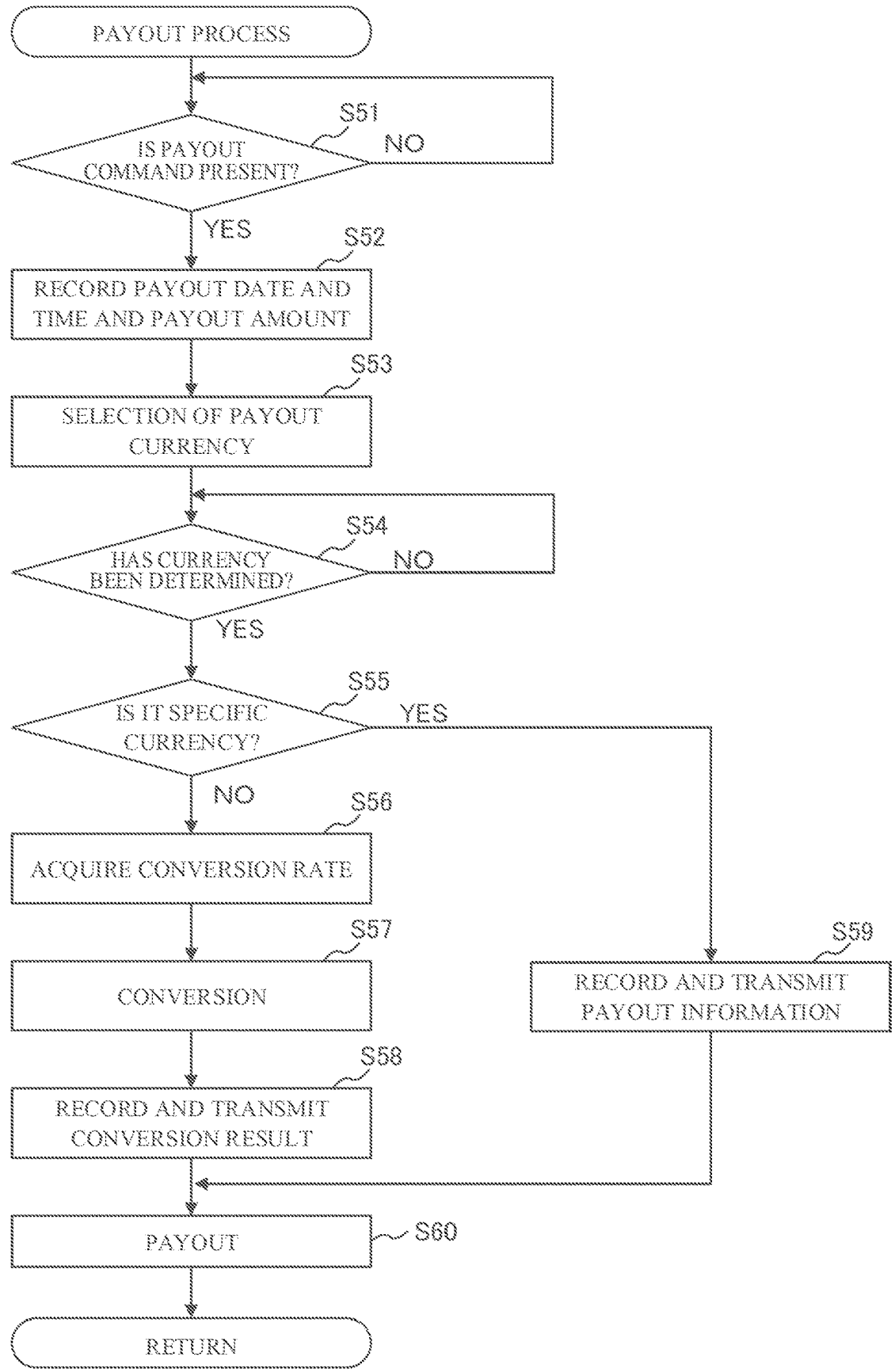
FIG. 12 is a flowchart illustrating a payout process.

FIG. 12 is a flowchart illustrating a payout process in the PTS terminal 700.

In the payout process, the CPU 751 of the PTS terminal 700 waits for reception of a payout command and the value of the payout amount credit number counter including the result of awarding the dividend from the game controller 70 (NO in S51). When the payout command and the value of the credit number counter including the result of awarding the dividend are received (YES in S51), the CPU 751 acquires the date and time at that time as the payout date and time to be stored in the RAM 753 (S52). The CPU 751 stores the payout amount (the amount represented in the specific currency (for example, "Philippine peso")) received from the game controller 70 in the RAM 753 in association with the payout date and time.

Furthermore, the CPU 751 displays a selection screen of a payout currency on the LCD 177 and waits for the selection by a touch operation on the selection screen (NO in S53 and S54). When a selection operation is made (YES in S54), the CPU 751 determines whether or not the selection result is the specific currency (for example, "Philippine peso") (S55).

When the selection result is the specific currency (YES in S55), the CPU 751 stores the payout amount (information represented by the amount in the specific currency) received from the slot machine 10 together with the payout command in the RAM 753 in association with the payout date and time and the payout amount information stored in the RAM 753 in step S52 described above and transmits the payout date and time stored in step S52 described above and the payout amount information received from the slot machine 10, the type of the selected payout currency, and the result converted into the selected payout currency (not converted when the selected payout currency is the specific currency) as information associated with each other to the SMS 1200 (information processing apparatus 500) (S59).

On the other hand, when it is determined, in step S55, that the player's selection result is a currency (for example, "US dollar") other than the specific currency (NO in S55), the CPU 751 acquires a conversion rate (exchange rate) for converting the specific currency (for example, "Philippine peso") into the selected currency (for example, "US dollar") from the RAM 753 (S56), and converts the payout amount based on the acquired conversion rate (S57). Then, the CPU 751 stores the conversion result in the RAM 753 in association with the payout date and time and the payout amount information stored in the RAM 753 in step S52 described above and transmits the payout date and time stored in step S52 described above and the payout amount information in the specific currency (for example, "Philippine peso") received from the slot machine 10, the type (for example, "US dollar") of the selected payout currency and the result converted into the selected payout currency as information associated with each other to the SMS 1200 (information processing apparatus 500) (S58).

After processing of step S59 or processing of step S58, the CPU 751 executes the payout process in the designated currency (S60). Specifically, the player selects either writing to the IC card or printout by the ticket printer, and a payout amount is paid out by the selected method. The selection of writing to the IC card or printout by the ticket printer can be performed by the player operating (touch panel operation) the selection screen displayed on the LCD 177 of the PTS terminal 700.

By executing the insertion process, in the PTS terminal 700, the type of paid-out currency and the payout amount converted into that currency, the payout amount represented in the specific currency before conversion, and the payout date and time and conversion rate (exchange rate) used for the conversion at the time of payout are correlated with each other and stored in the PTS terminal 700 and the SMS 1200 (information processing apparatus 500). Therefore, sales can be easily totaled based on the stored information.

(Recording Processing of Conversion Rate and Conversion Date and Time)

Figure 13:
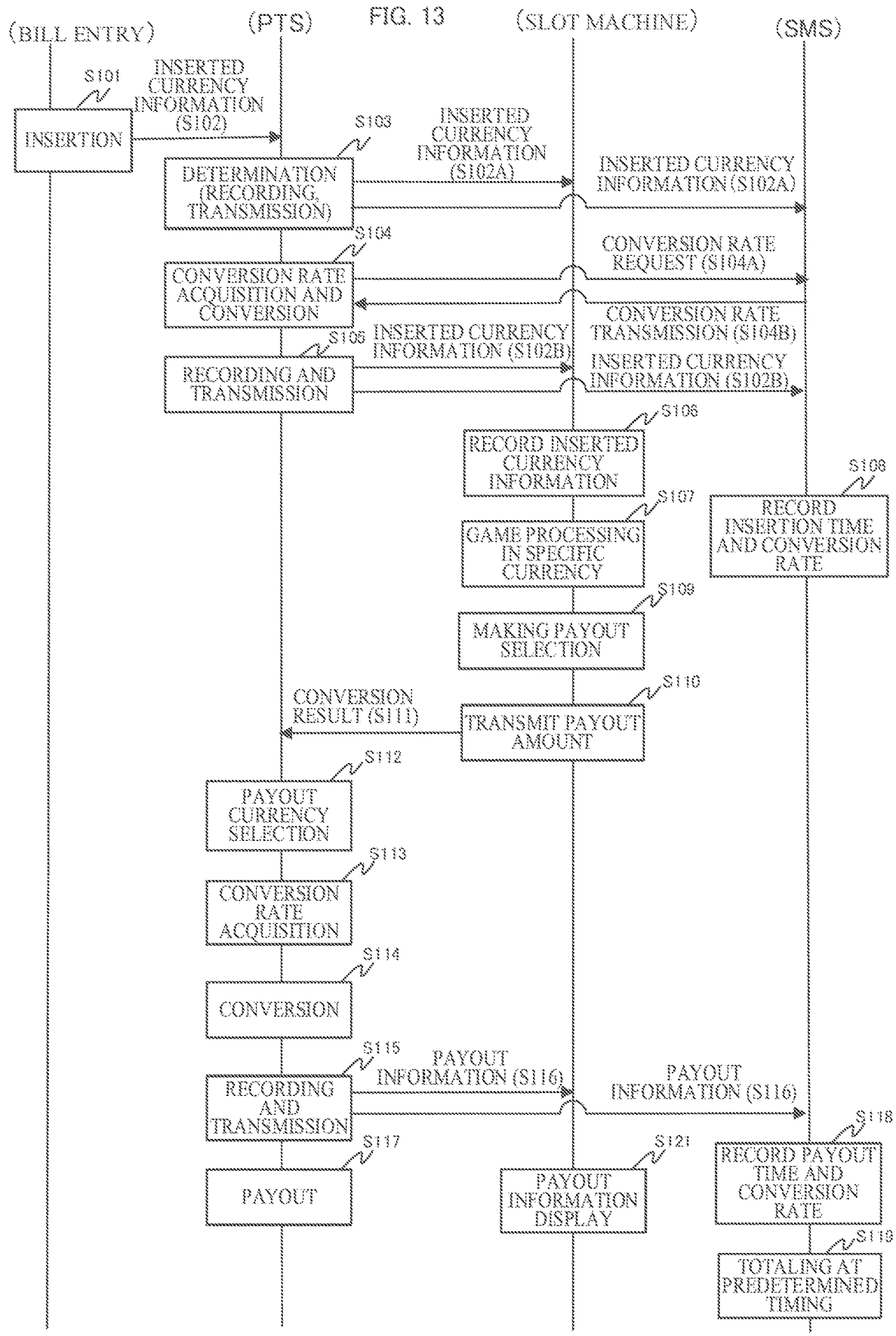
FIG. 13 is a flowchart illustrating a totaling process by a PTS terminal, a slot machine (game controller), an information processing apparatus for totaling payout history.

FIG. 13 is a flowchart illustrating a totaling process by the PTS terminal 700, the slot machine 10 (game controller 70), and the SMS 1200 (information processing apparatus 500) for totaling an insertion history when the player inserts a currency into the bill entry 60 in order to play the game and a payout history when the payout including the dividend awarded to the player as a result of the game is made When a bill is inserted into the bill entry 60 (S101), inserted currency information indicating the type of inserted currency and the amount in that currency is transmitted from the bill entry 60 to the PTS terminal 700 (S102). In the PTS terminal 700, information indicating the type of the specific currency (for example, "Philippine peso") preset in the game controller 70 is stored in the RAM 753, the inserted currency is determined and also it is determined whether or not the inserted currency matches the specific currency, and the determination result (information indicating the type of inserted currency and the date and time when the inserted currency information is received (insertion date and time)) is stored in the RAM 753 (S103). The insertion date and time are not limited to the date and time when the PTS terminal 700 receives the inserted currency information from the billing entry 60, and, for example, the date and time when the bill is inserted into the bill entry 60 may be included in the inserted currency information and transmitted from the bill entry 60 to the PTS terminal 700, which may be stored in the RAM 753 as the insertion date and time, or the date and time when the rate conversion described later is executed may be stored as the insertion date and time. When it is determined, in this determination processing (S103), that the inserted currency is the specific currency (for example, "Philippine peso"), the PTS terminal 700 transmits inserted currency information S102 (information including the fact that the inserted currency type is the specific currency, and the amount represented by that currency) received from the bill entry 60 to the slot machine 10 (game controller 70) (S102A). The inserted currency information S102A is also transmitted from the PTS terminal 700 to the SMS 1200 and stored in the SMS 1200 (information processing apparatus 500) (S108).

On the other hand, when it is determined, in the determination processing (S103), that the inserted currency type is a currency other than the specific currency, the PTS terminal 700 acquires a conversion rate (exchange rate) for converting the inserted currency (for example, "US dollar") into the specific currency (for example, "Philippine peso") from the SMS 1200 (S104A and S104B). In this embodiment, although the conversion rate is acquired from the SMS 1200 and used for conversion each time the player inputs a currency (each time the inserted currency is determined in step S103), instead of this, the conversion rate stored in the RAM 753 of the PTS terminal 700 may be read each time the player inserts a currency and the conversion rate may be used to perform the conversion. Specifically, each time the conversion rate is updated in the SMS 1200, the updated content is transmitted from the SMS 1200 to the PTS terminal 700, and the conversion rate in the RAM 753 is updated in the PTS terminal 700. Then, each time a bill is inserted into the bill entry 60, the inserted currency is converted into the specific currency using the latest conversion rate stored in the RAM 753 in the PTS terminal 700. In this way, the PTS terminal 700 does not need to communicate with the SMS 1200 each time a bill is inserted into the bill entry 60.

When the conversion rate between the inserted currency and the specific currency is acquired, in the PTS terminal 700, the conversion rate acquired according to the inserted currency, insertion date and time (conversion date and time), inserted currency (Currency), and the denomination of the inserted bill (for example, when a US dollar bill is inserted, information representing the denomination of the US dollar bill) are stored in the RAM 753 as the inserted currency information S102B, and transmitted to the slot machine 10 (game controller 70) and the SMS 1200 (information processing apparatus 500) (S105). In this processing, the PTS terminal 700 converts the inserted amount in the inserted currency into the specific currency using the acquired conversion rate, stores the conversion result (rate (Exchange Rate) and conversion amount (Exchange Amount) illustrated in FIG. 14) in the RAM 753 and transmits the conversion result to the slot machine 10 (game controller 70) and the SMS 1200 in the state of being included in the inserted currency information S102B described above.

Information related to the inserted currency is displayed on the control panel 30 as the display in the inserted currency. Although the insertion date and time (conversion date and time) recorded and transmitted in the processing of step S105 means the date and time when the conversion rate is acquired from the outside or the RAM 753 at the time of conversion, it is regularly (for example, once a day at a designated time) input by the operator of the CMS 1400 based on the latest exchange rate in the CMS 1400, and the input result is displayed on the display unit of the SMS 1200. Based on this display, the operator of the SMS 1200 inputs the latest conversion rate to the SMS 1200 using the input device. The SMS 1200 stores the input conversion rate in the storage unit of the SMS 1200 and transmits the conversion rate to the PTS terminal 700. The PTS terminal 700 stores the conversion rate transmitted from the SMS 1200 in the RAM 753 of the PTS terminal 700.

When the inserted currency is the specific currency, information indicating the type of the currency and the amount represented in the currency are transmitted from the PTS terminal 700 to the slot machine 10 (game controller 70), and when the inserted currency is a currency other than the specific currency, the information indicating the type of the currency and the amount converted into the specific currency are transmitted from the PTS terminal 700 to the slot machine 10 (game controller 70). The game controller 70 of the slot machine 10 stores the inserted currency information S102A or S102B transmitted from the PTS terminal 700 in the internal storage unit (S106). The stored inserted currency information S102A is used when determining in which currency the amount (the amount represented in "Philippine peso", the amount represented in "US dollar", the amount represented in "yen", and the like) is displayed in the betting amount display on the control panel 30 described later.

In the game controller 70, the game proceeds with the inserted amount in the specific currency (for example, "Philippine peso") received from the PTS terminal 700 (S107). In addition, when the player desires to display in the currency inserted by the player by the player's selection, by a predetermined selection operation, the result (display of betting amount and the like) of converting the display of the control panel 30 into the currency inserted by the player is obtained, instead of the specific currency actually used in the game in the slot machine 10 (details will be described later).

In the SMS 1200 (information processing apparatus 500) that has received the inserted currency information S102B from the PTS terminal 700, the inserted currency information S102B is stored in the storage unit. Specifically, pieces of information such as the type and amount of inserted currency, date and time of insertion, conversion rate when converted and date and time of acquisition thereof, conversion result (amount in the specific currency after conversion), and the like are associated with each other at each insertion and are accumulated together with the inserted currency information S102A described above (S108). Based on this accumulated information, sales, and the like in the slot machine 10 can be totaled (S119).

When the game ends on the slot machine 10 (game controller 70) and the player operates the CASHOUT/TAKE WIN button 32 (S109), in the slot machine 10, the number of credits paid out is converted into the specific currency (for example, "Philippine peso") and the conversion result S111 is transmitted to the PTS terminal 700 (S110).

The PTS terminal 700, which has received information (conversion result S111) indicating the payout amount in the specific currency, determines the type of currency designated by the player (S112) and acquires a conversion rate (exchange rate) for converting the specific currency into the selected currency from the RAM 753 (S113). In this embodiment, the conversion rate is regularly (for example, once a day) input to the CMS 1400 (information processing apparatus 500). The CMS 1400 stores and displays the input conversion rate. In the SMS 1200, the conversion rate is input by the operator and stored in the storage unit of the SMS 1200, and further, the conversion rate is transmitted from the SMS 1200 to the PTS terminal 700 and stored in the RAM 753 in the PTS terminal 700. Although the PTS terminal 700 reads the latest conversion rate from the RAM 753 at the time of conversion and uses the conversion rate for the conversion, instead of this, the PTS terminal 700 may obtain the conversion rate from the outside via the CMS 1400 and the SMS 1200 (information processing apparatus 500) each time the conversion is performed.

When the conversion is performed at the acquired conversion rate (S114), the type of currency paid out and the payout amount converted into that currency, the payout amount represented in the specific currency before conversion, and payout date and time and conversion rate (exchange rate) used for the conversion at the time of payout are stored in the RAM 753 as payout information S116 correlated with each other and transmitted to the slot machine 10 (game controller 70) and the SMS 1200 (information processing apparatus 500) (S115).

In the PTS terminal 700, the payout is performed using a medium (IC card or ticket) selected by the player after the payout information S116 is stored and transmitted (S117).

In the slot machine 10 (game controller 70) that has received the payout information S116 from the PTS terminal 700, the conversion result is displayed as payout information on the lower image display panel 141, for example. That is, the payout amount is converted into the currency inserted by the player and displayed.

The SMS 1200 (information processing apparatus 500) which has received the payout information S116 from the PTS terminal 700 records the payout information (the currency relating to the payout and the amount converted into the currency, the payout date and time, the conversion rate, and the like) (S118).

Therefore, as illustrated in FIG. 14, in the RAM 753 of the PTS terminal 700 and the SMS 1200 (information processing apparatus 500), the contents (inserted currency, insertion date and time (conversion date and time), conversion rate, and the like) that the player inserted a currency, the contents (payout currency, payout date and time (conversion date and time), conversion rate, and the like) of the currency paid out to the player are accumulated, so that the sales by the slot machine 10 can be totaled by totaling these at a predetermined timing (S119).

In FIG. 14, for example, as history NO. 1, matters that a bill of which currency (Currency) is US dollar (USD) and the denomination is a 100-dollar bill is inserted into the bill entry 60 connected to the PTS terminal 700 (slot machine 10A) specified by installation area (Location) of "C010202" and asset number (ASSET NO) of "1003001" on 1 Dec. 2018 at 10:00:28 AM and a total (Exchange Amount) of 4523.14 PHP was converted with a conversion rate (Exchange Rate) for the Philippine peso being 1 USD=45.2314 PHP are indicated.

As history NO. 2, matters that a bill of which currency (Currency) is US dollar (USD) and the denomination is a 100-dollar bill is inserted into the bill entry 60 connected to the PTS terminal 700 (slot machine 10A) specified by installation area (Location) of "C010202" and asset number (ASSET NO) of "1003001" on 1 Dec. 2018 at 10:01:35 AM and a total (Exchange Amount) of 4523.14 PHP was converted with a conversion rate (Exchange Rate) for the Philippine peso being 1 USD=45.2314 PHP are indicated.

As history NO. 3, matters that a bill of which currency (Currency) is US dollar (USD) and the denomination is a 100-dollar bill is inserted into the bill entry 60 connected to the PTS terminal 700 (slot machine 10B) specified by installation area (Location) of "C010202" and asset number (ASSET NO) of "1003005" on 1 Dec. 2018 at 10:02:40 AM and a total (Exchange Amount) of 4523.14 PHP was converted with a conversion rate (Exchange Rate) for the Philippine peso being 1 USD=45.2314 PHP are indicated.

As history NO. 4, matters that a bill of which currency (Currency) is US dollar (USD) and the denomination is a 50-dollar bill is inserted into the bill entry 60 connected to the PTS terminal 700 (slot machine 10B) specified by installation area (Location) of "C010202" and asset number (ASSET NO) of "1003005" on 1 Dec. 2018 at 10:02:55 AM and a total (Exchange Amount) of 2261.57 PHP was converted with a conversion rate (Exchange Rate) for the Philippine peso being 1 USD=45.2314 PHP are indicated.

As history NO. 5, matters that a bill of which currency (Currency) is Japanese yen (JPY) and the denomination is a 10000-yen bill is inserted into the bill entry 60 connected to the PTS terminal 700 (slot machine 10C) specified by installation area (Location) of "C010204" and asset number (ASSET NO) of "1002014" on 1 Dec. 2018 at 10:03:01 AM and a total (Exchange Amount) of 4754.40 PHP was converted with a conversion rate (Exchange Rate) for the Philippine peso being 1 JPY=0.47544 PHP are indicated.

As described above, in the information management system 100 of this embodiment, history information illustrated in FIG. 14 is stored in the PTS terminal 700 and the SMS 1200. The PTS terminal 700 stores the history regarding these conversions together with the result of conversion into the specific currency (for example, "Philippine peso") using the conversion rate of the corresponding currency according to the bill inserted into the bill entry 60. The PTS terminal 700 transmits history information representing the history to the SMS 1200. The SMS 1200 stores the history information transmitted from the PTS terminal 700 in the storage unit of the SMS 1200. A time stamp indicating the date and time when the bill is inserted into the bill entry 60 and converted is stored in correlation with each history information in this history information, so that the effect of the failure can be verified by comparing the time stamp of each history information stored in the SMS 1200 with the time stamp of each history information stored in the PTS terminal 700, for example, when a failure occurs in a system. In addition, the fraud verification can be executed by the same method.

In totaling by SMS 1200 (information processing apparatus 500), when a difference between the totaled result obtained from the inserted amount and the payout amount transmitted from the PTS terminal 700 and the actual balance of the casino facility occurs, the CPU 551 (FIG. 1B) of the SMS 1200 (information processing apparatus 500) can determine whether the difference is due to a fluctuation in the conversion rate (exchange rate) or there is a possibility of other causes such as fraud. Specifically, when the conversion rate is acquired regularly (once a day, and the like) and stored in the PTS terminal 700 or the slot machine 10, and the conversion of the player's inserted currency into the specific currency or the conversion at the time of payout by the stored conversion rate is performed and the conversion results are totaled by SMS 1200 (information processing apparatus 500), after that, there may be an error with the result of exchanging the balance of the casino facility (store) with the latest conversion rate (exchange rate) and totaling the balance. Regarding this error, however, the date and time when the player inserts the currency, the conversion rate, and the type of the inserted currency (such as US dollars) are transmitted to the SMS 1200 (information processing apparatus 500) and accumulated, and thus the cause of the error can be specified by this accumulated information.

(Bet Display Process According to Inserted Currency)

Figure 15:
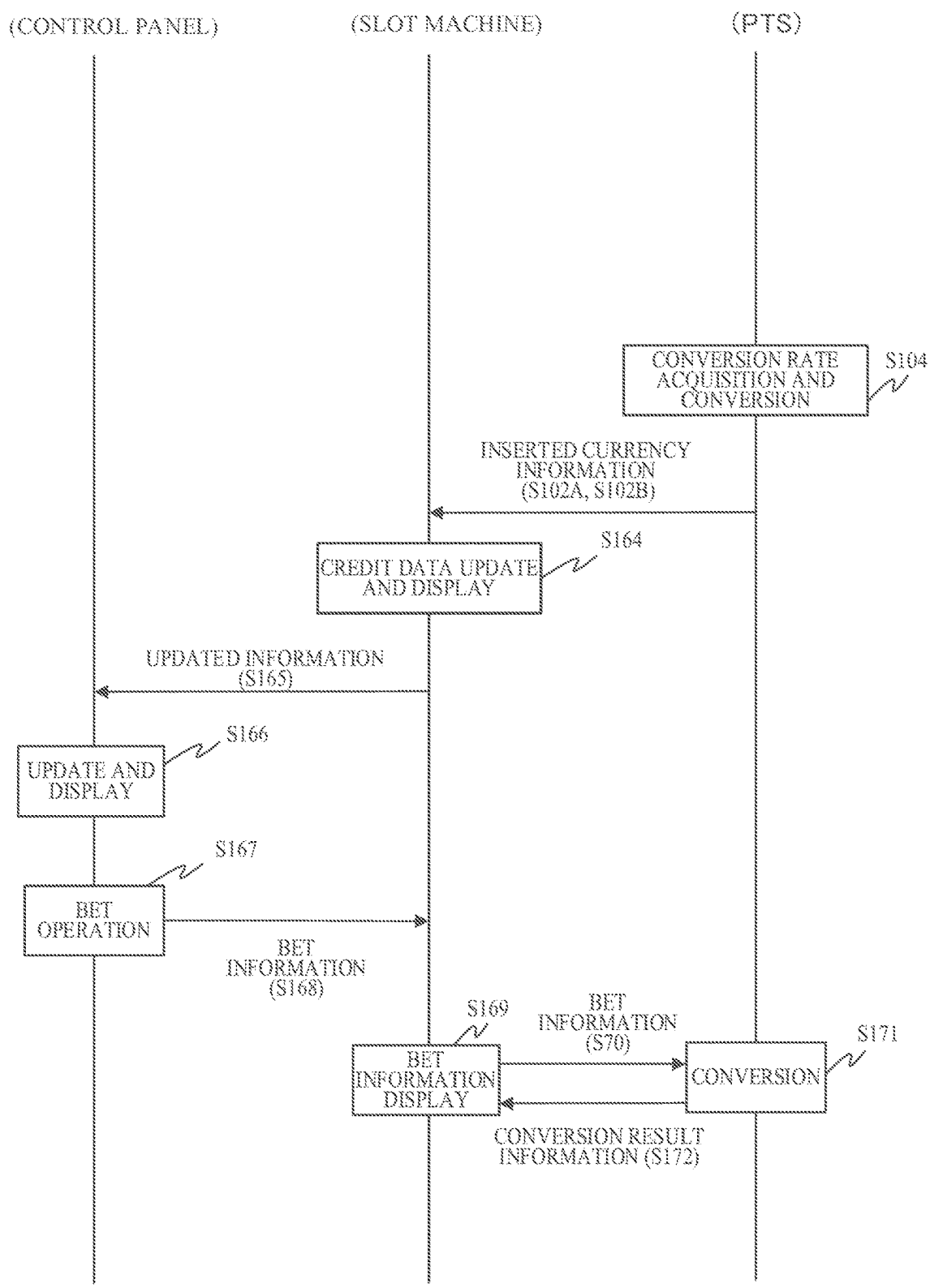
FIG. 15 is a flowchart illustrating a process of generating a prize generation process.

In the process illustrated in FIG. 13 described above, the slot machine 10 (game controller 70) that has received the inserted currency information S102B executes a bet display process illustrated in FIG. 15 in parallel with the process of FIG. 13. That is, as illustrated in FIG. 15, when it is determined that the currency inserted in the PTS terminal 700 is the specific currency, the amount information represented by the specific currency is transmitted to the game controller 10 of the slot machine 10 as inserted currency information (S102A). In contrast, when the inserted currency is a currency different from the specific currency, the inserted currency is converted to the amount represented in the specific currency based on the conversion rate acquired in the PTS terminal 700 or the conversion rate stored in the RAM 753 (FIG. 9A), and information indicating the inserted currency, information indicating the amount in the currency before the conversion (the currency of the inserted bill), and information of the amount in the specific currency after the conversion are transmitted to the slot machine 10 (game controller 70) as inserted currency information (S102B).

When only the information indicating the amount represented in the specific currency is transmitted from the PTS terminal 700 (S102A), the slot machine 10 (game controller 70) determines that the inserted currency is the specific currency and updates the credit data by converting the inserted amount of money into the number of credits and adding the number of credits to the credit data stored within the game controller 70 (S164). In contrast, when information indicating a currency unit other than the specific currency and information indicating the amount of money before and after the conversion are transmitted from the PTS terminal 700 (S102B), the game controller 70 updates the credit data based on the information indicating the currency unit and the information of the amount of money before and after the conversion (S164). The credit data is the result of converting the amount data of the inserted currency into the number of credits by the bet amount table illustrated in FIGS. 9B and 9C and is stored in the storage unit of the game controller 70.

In the case of this embodiment, the betting amount table (FIGS. 9B and 9C) is rewritten at any time according to the fluctuation of the conversion rate (exchange rate), so that a conversion rate obtained by inserting a currency into the bill entry 60 by the player and converting the currency into the specific currency matches the betting amount table (FIGS. 9B and 9C) stored in the game controller 70. The conversion rate when the player inserts (converts) a currency into the bill entry 60 (this means the conversion rate between the inserted currency and the specific currency (FIG. 9A) and the conversion rate between these and the number of credits (FIGS. 9B and 9C)) is stored until the player next inserts a currency and conversion is performed.

In the case of this embodiment, in the game controller 70, "Philippine peso" is stored (set) in advance in the storage unit as the specific currency, and when the specific currency is inserted, information of the amount of money is stored as credit data, whereas when a currency other than the specific currency is inserted, information (information indicating the type of currency and image (symbol) data for visually displaying the type) representing the inserted currency, information of the amount represented in the inserted currency, and information indicating the amount that is the result of converting the amount of the inserted currency into the specific currency are stored as a set as credit data.

That is, in credit data update and display processing (S164), when the specific currency is inserted, only information indicating the amount in the specific currency and the number of credits corresponding thereto is stored as the credit data, and when a currency other than the specific currency is inserted, information indicating the inserted currency, information indicating the amount in that currency, information indicating the amount converted to the specific currency, and information indicating the number of credits corresponding thereto are stored as credit data. Thus, the game controller 70 can grasp the currency to be displayed to the player by checking the content of the credit data.

That is, the game controller 70 checks the information stored as the credit data, and when the information of the amount represented in the specific currency and the information of the amount in a currency other than the specific currency (and information indicating the number of credits corresponding thereto) are stored as a set, the game controller 70 can determine that a currency other than the specific currency has been inserted. In this case, by displaying the amount represented in the inserted currency other than the specific currency on the lower image display panel 141, the internal processing is performed on the amount resulting from the conversion into the specific currency, whereas the displayed amount can be the amount converted into the inserted currency. In this case, in addition to the display of the amount, by displaying an image (symbol) representing the type of currency (currency other than the specific currency), the player can easily grasp the currency of the displayed amount. For example, when the currency of the inserted bill is "US dollar" other than the specific currency (for example, "Philippine peso"), "$10" is displayed as the display content. That is, the currency can be represented by displaying the symbol "$" representing the dollar in front of the number. The image (symbol) representing the currency is not limited to the dollar mark, and, for example, an image (for example, an image representing a national flag) that impresses a large "US dollar" may be displayed in another display frame.

In contrast, when only the information of the amount represented in the specific currency is stored as the credit data, the game controller 70 displays the amount in the specific currency on the lower image display panel 141. For example, when the specific currency is "Philippine peso," the amount converted into "Philippine peso" is displayed together with the symbol (a symbol with two horizontal lines added to "P") representing the currency of the "Philippine peso". FIG. 9D is a schematic diagram illustrating a display example (display example of a WIN meter 206 on the lower image display panel 141) of the amount of the dividend (prize) displayed on the lower image display panel 141. As illustrated in FIG. 9D, when a dollar bill is inserted into the bill entry 60, the amount of the dividend (prize) awarded to the player as a result of the game is converted into "US dollar" in the PTS terminal 700 by the control of the game controller 70 and displayed on the WIN meter 206. In this case, the game controller 70 displays a symbol representing the currency of "US dollar" together with the amount. In contrast, when a Philippine peso bill is inserted into the bill entry 60, the amount of the dividend (prize) is displayed by the amount converted into the "Philippine peso" currency and the symbol representing the currency.

When a bill of the specific currency is newly inserted into the bill entry 60 in a state where a bill is displayed in a currency other than the specific currency due to an insertion of the bill of the currency other than the specific currency, in the credit data update and display processing (S164), the game controller 70 which has received the inserted currency information (S102B) from the PTS terminal 700 deletes the information of the amount in the currency other than the specific currency and uses only the information of the amount in the specific currency, out of the set of the information of the amount in the specific currency and the information of the amount in the currency other than the specific currency that are stored until then. Thus, it is possible to determine that the information to be displayed is the information of the amount in the specific currency. Regarding which currency is used for the display, dedicated information may be stored separately in the storage unit of the game controller 70 as display currency information.

When the credit data is updated in the game controller 70 (game controller 70), the updated information is transmitted to the control panel 30 (S165). The control panel 30 updates the display information stored in the display controller 170 based on the updated information sent from the game controller 70 (S166). This display information is information for displaying the betting amount (betting amount allocated to the credit buttons 40, 41, 42, 43, and 44) displayed on the display devices 40a, 41a, 42a, 43a, and 44a of the control panel 30, and is image data of specific characters for displaying the amount of money of credits required for betting by an amount represented in the specific currency or an inserted currency other than the specific currency. For example, when the inserted currency is the specific currency (for example, "Philippine peso"), on the display devices 40a, 41a, 42a, 43a, and 44a, the number of credits required for betting is displayed, and the amount of money corresponding thereto is displayed in the specific currency (for example, "Philippine peso"). On the other hand, when the currency of the inserted currency is a currency other than the specific currency (for example, "US dollar"), on the display devices 40a, 41a, 42a, 43a, and 44a, the number of credits required for betting is displayed, and the amount of money corresponding thereto is displayed in the currency of the inserted currency (for example, "US dollar"). Display information (betting amount table illustrated in FIGS. 9B and 9C) for performing this display is stored in the game controller 70, and the game controller 70 refers to the betting amount table to select information to be displayed on the display devices 40a, 41a, 42a, 43a, and 44a of the control panel 30 (the number of bets required to start the game and amount corresponding to the number of bets (amount represented in the specific currency when the inserted currency is the specific currency, whereas amount represented in the currency of the inserted currency when the inserted currency is a currency other than the specific currency)) and transmit the information to the display controller 170. The display controller 170 displays each piece of information on the display devices 40a, 41a, 42a, 43a, and 44a of the control panel 30 based on this information. The display controller 170 also performs the display on the display devices 34a to 38a of the control panel 30. Thus, when the currency unit of the inserted bill is different from the currency inserted so far, the amount (currency) displayed on the display devices 40a, 41a, 42a, 43a, and 44a of the control panel 30 is changed by the credit data update and display processing (S164) and the update and display processing (S166).

In this way, in the game controller 70, when the player operates the control panel 30 to input a bet (S167) in a state where the credit data is updated and the display of each display device of the control panel 30 is updated, bet information (operation information) indicating the betting content is transmitted from the control panel 30 to the game controller 70 (S168). In the credit data update and display processing (S164), in the game controller 70, the number of credits and the amount of money displayed on each display device of the control panel 30 is stored, the functions allocated to the buttons 34 to 38 and 40 to 44 provided with the respective display devices are stored, and the bet number and the amount of money corresponding thereto can be grasped based on the operation information (information indicating the operated button) of the control panel 30.

Thereby, the game controller 70, which has received the information indicating the betting content from the control panel 30, displays the bet information on a part of the lower image display panel 141 of the slot machine 10 (S169). In this case, the game controller 70 displays the betting amount in the specific currency or a currency other than the specific currency on the lower image display panel 141 based on the credit data (or the display currency information stored separately) stored in the storage unit. Specifically, when the currency inserted in the bill entry 60 is the specific currency, the betting amount is displayed in an amount represented in the specific currency, and when the inserted currency is a currency other than the specific currency, the betting amount is displayed in an amount represented in the inserted currency.

The game controller 70 is configured such that the progress (a bet, calculation of the dividend, and the like) of the game is performed with the amount represented in the specific currency, and when the betting amount in a currency other than the specific currency is displayed on the lower image display panel 141, the game controller 70 obtains a betting amount in the specific currency based on the bet information (S168) (button operation information) from the control panel 30 and transmits the obtained betting amount to the PTS terminal 700 as bet information (S170). The PTS terminal 700 converts the betting amount into an amount represented in a currency other than the specific currency at the conversion rate illustrated in FIG. 9A (S171), and returns the conversion result to the game controller 70 as conversion result information (S172). Thus, in the game controller 70, when the player operates the control panel 30 to make a bet input, information about the bet input (betting amount represented in the currency of the inserted currency other than the specific currency) is displayed by the game controller 70 on a part of the lower image display panel 141 of the slot machine 10. In addition to the betting amount in the currency unit, the PTS terminal 700 calculates the corresponding number of credits and transmits the calculated number of credits to the game controller 70, so that the game controller 70 can also display the betting amount on the lower image display panel 141 according to the number of credits.

The information indicating the currency of the inserted currency, the amount information, the information of the amount of currency displayed on the display devices 40a, 41a, 42a, 43a, 44a, and further, the information for displaying the image thereof can be stored in various storage units such as the storage unit of the PTS terminal 700, the display controller 170, and the game controller 70, and used.

The conversion of the rate may be executed (for example, the game controller 70, the control panel 30, and the like) other than the PTS terminal 700.

As described above, in this embodiment, in the configuration in which the game processing of the slot machine 10 (game controller 70) is performed in the specific currency, a display of each display unit of the control panel 30 and a display on the lower image display panel 141 (for example, if the inserted bill is "US dollar", it is displayed as "US dollar", and if the inserted bill is "Philippine peso", it is displayed as "Philippine peso") are performed according to the currency of the bill inserted into the bill entry 60, thereby allowing a display for the player to easily understand with the currency used by the player.

In the bet display process illustrated in FIG. 15, when the currency that the player has inserted into the bill entry 60 is not the specific currency, the currency is converted into the specific currency at the conversion rate acquired in the PTS terminal 700, and the game is executed by the slot machine 10 (game controller 70) based on the conversion result. In this case, in the control panel 30, a display in the currency inserted by the player (that is, display as the amount that is not converted) is performed. Then, the conversion rate (FIGS. 9A to 9C) used for the conversion when the currency is inserted is stored until the next currency is inserted and the conversion is performed and is used for the display on the control panel 30. Specifically, after the currency is inserted, the conversion rate is acquired, and conversion processing is performed (after S104), the conversion rate is stored until the next currency is inserted. Therefore, the player can perform an operation related to the progress of the game such as a bet operation while watching the display based on the conversion rate when the currency is inserted.

At the time of payout after the game ends, the player can select a currency to receive the payout (S109), and the conversion rate is newly acquired when this selection is made (S113). Thus, at the time of payout, the player can select whether to receive the payout in the specific currency (for example, "Philippine peso") as it is while watching the rate or to receive the payout converted into a foreign currency in consideration of the rate. At the time of payout (S109), for example, by displaying the conversion rate on the LCD display unit of the PTS terminal 700, the lower image display panel 141 of the slot machine 10, or the like, the player can easily determine whether or not to convert the currency into a foreign currency different from the specific currency and payout.

(Display Contents of Display Device)

On the lower image display panel 141 of the slot machine 10, information related to currency information illustrated in FIG. 16 is displayed.

In addition to the symbol display region 150, the lower image display panel 141 is provided with a denomination touch icon 201, a MENU touch icon 202, a volume touch icon 203, a CREDIT meter 204, a BET meter 205, the WIN meter 206, a game message display region 207, a free game number counter (FG counter) 208, a WAY number display region 209, an error history display region 210, a system message display region 211, a clock display region 212 (including an upper display switching icon), a stock counter display region 214 at the time of retriggering.

The CREDIT meter 204 displays an amount obtained by summing up the amount that the player has inserted into the slot machine 10 (game controller 70) and the amount of money awarded to the player as a result of the game in the currency of the bill inserted into the bill entry 60 by the player. Specifically, when the currency unit of the bill inserted by the player is "US dollar", the PTS terminal 700 transmits the inserted currency information (currency represented in "US dollar" and the amount thereof) transmitted from the bill entry 60 to the game controller 70 together with specific currency information including the amount represented in the specific currency (for example, "Philippine peso") and the number of credits corresponding thereto. The game controller 70 that has received these pieces of information displays the amount on the CREDIT meter 204 in the currency (for example, "US dollar") that the player has inserted. In this case, the game controller 70 displays the symbol representing the currency unit "US dollar" together with the amount, based on the information indicating the currency unit (for example, "US dollar") of the inserted currency sent from the PTS terminal 700.

When the currency unit of the bill inserted into the bill entry 60 is "Philippine peso", the game controller 70 switches the symbol indicating the amount and the currency unit thereof displayed on the CREDIT meter 204 to the notation indicating "Philippine peso".

The player can place BET on the game within a range of the amount displayed on the CREDIT meter 204. In this embodiment, in addition to the display of the inserted currency in the currency unit, it is possible to display, for example, the number of credits. The display by the number of credits means the result of converting the currency unit inserted by the player into the number of credits by the rate at that time. Specifically, when the currency unit of the bill inserted by the player is "dollar", the game controller 70 can display the currency on the CREDIT meter 204 by the number of credits (for example, the number of credits equivalents to 1 php=1 credit when converting "dollar" to "peso") converted from the inserted amount, based on the inserted currency information transmitted from the PTS terminal 700 and the specific currency information including the result of converting the inserted currency information into the specific currency (for example, "peso") and the number of credits corresponding thereto.

The CREDIT meter 204 is configured with a touch icon and can switch and display only the display in the inserted currency or only the display in the number of credits by being touched by the player.

The CREDIT meter 204 is displayed by subtracting the betting amount each time the player designates the betting amount and displayed by adding the dividend amount each time the dividend is awarded as a game result.

The BET meter 205 displays the total amount of the betting amounts for running the game, which is designated by the player operating the control panel 30. When the player operates the control panel 30 to designate the betting amount, information indicating the designated betting amount is transmitted from the control panel 30 to the PTS terminal 700, the betting amount represented in the currency unit of the inserted currency is calculated in the PTS terminal 700, and the number of credits equivalent to this is calculated in the game controller 70. Based on these pieces of information, the game controller 70 selectively displays the betting amount designated by the player by the amount in the inserted currency (for example, "US dollar"), the number of credits, or both (FIG. 16). This selection can be executed by the game controller 70 by touching the BET meter 205 having a touch icon configuration. The game controller 70 displays the betting amount displayed on the BET meter 205 as a total amount until the end of the game, not for each game, by adding the betting amount until the player finishes the game and pays out his or her own credits. The BET meter 205 is updated each time each game is played.

As described above, when the currency unit of the bill inserted into the bill entry 60 is "US dollar", as the betting amount as illustrated in FIG. 16, the amount converted into "US dollar" and a symbol representing the currency unit ("US dollar") are displayed on the BET meter 205. In contrast, when the specific currency (for example, "Philippine peso") is inserted into the bill entry 60, the BET meter 205 displays both the amount converted into "peso" and a symbol representing the specific currency ("Philippines peso") (symbol with two horizontal lines added to "P"). That is, when a dollar bill is inserted, the betting amount input by the player operating the control panel 30 is displayed in the currency unit of "US dollar" on the BET meter 205 of the lower image display panel 141, and in contrast, when the Philippine peso bill is inserted, the betting amount input by the player operating the control panel 30 is displayed in the currency of "Philippine peso" on the BET meter 205.

The WIN meter 206 displays the amount of the dividend (prize) awarded to the player based on the result of each game, and when a dividend is generated as a result of the execution of the game, the game controller 70 selectively displays the amount by an amount in the inserted currency (for example, "US dollar"), the number of credits, or both (FIG. 16). This selection can be performed by touching the WIN meter 206 having a touch icon configuration. Although, in the WIN meter 206 illustrated in FIG. 16, a case where the currency unit of the bill inserted into the bill entry 60 is "US dollar" is illustrated, when the currency unit of the bill inserted into the bill entry 60 is "Philippine Peso", as illustrated in FIG. 8D, the game controller 70 is switched to the notation (for example, a symbol with two horizontal lines added to "P") by the amount in the "Philippine peso" and the symbol representing the currency unit thereof, based on the amount data in the currency unit of "Philippine peso" obtained from the PTS terminal 700.

Other Embodiments

In the embodiment described above, the case where a bill is used as a game medium (paper sheet) has been described, but the present invention is not limited thereto and, for example, a coin, a medal, a token, a ticket with a barcode, and the like, in addition to electronic valuable information such as electronic money can be applied. Further, the currency unit is not limited to "Philippine peso" and "US dollar", and various currency units can be applied.

In the embodiment described above, the case where the conversion between the currency unit of the inserted bill and the specific currency set in the slot machine 10 is performed in the PTS terminal 700 has been described, but is not limited thereto and may be executed in other devices such as the game controller 70.

In the embodiment described above, the case where the present invention is applied to the slot machine 10 is described, but the present invention is not limited thereto and can be widely applied to other game machines and other devices such as a vending machine for drinks and the like. In the case of being applying to a vending machine for drinks and the like, when a user inserts a currency of a currency unit other than the specific currency into the vending machine, a control unit of the vending machine converts the inserted currency into the specific currency and then executes a selling process in the specific currency. The selling process means a process of deducting the price of the product designated by the user operating a push button or the like from the inserted amount and paying out the remaining money as change. In this case, regarding the display of the inserted amount and the amount of change, the control unit displays not the specific currency in which the selling process is performed, but the result converted from the specific currency into the currency unit inserted by the user, so that the user can see the display in the currency unit that he or she is accustomed to and easily grasp the amount.

In the embodiment described above, the case where the game controller 70 executes display control of the credit data (data such as the BET amount and the number of credits inserted by the player) on the control panel 30 and the lower image display panel 141 has been described, but the present invention is not limited thereto and the display control may be executed by other devices, such as the PTS terminal 700 and the like.

In the embodiment described above, the case where the date and time when the player inserted the currency into the bill entry 60 and the conversion rate (exchange rate) at that time are stored has been described, but the present invention is not limited thereto and for example, the date and time and the exchange rate at the timing of betting (BET) on the game play may be stored. In this way, it is possible to treat the timing at which the player inserts the amount of money for a game as a bet time and to treat as if the exchange is performed at the exchange rate at that timing.

In the embodiment described above, the case where it is determined whether an inserted bill (currency) is the specific currency (for example, Philippine peso) and if it is not the specific currency, the inserted bill is converted into the specific currency using the conversion rate has been described, but the present invention is not limited thereto and can be applied to a configuration in which it is not determined whether or not the inserted bill is the specific currency. That is, in the configuration in which the inserted bill (currency) is converted at the conversion rate "1.0" (for example, the configuration in which, when 500 php is inserted, it is converted to 500 php by the conversion rate of "1.0"), information at the time of conversion (conversion rate, conversion time, and the like) is saved in both the terminal apparatus (PTS terminal 700) and the information management apparatus 500, thereby making it possible to easily check sales later by comparing and verifying the saved information even if a failure occurs in a system.

REFERENCE SIGNS LIST

10: slot machine
30: control panel
60: bill entry
70: game controller
141: lower image display panel
170: display controller
500: information processing apparatus
700: PTS terminal

The invention claimed is:

1. A terminal apparatus communicably connected to a gaming machine in which a game can be played according to an inserted currency, the terminal apparatus comprising:
   a first storage device that stores a conversion rate and updates the conversion rate based on a latest exchange rate that is regularly acquired;
   a control device that executes an insertion process for converting an amount of the inserted currency into an amount of a specific currency based on the conversion rate updated in the first storage device;
   a second storage device that stores, for history management, inserted currency information including currency information representing a type of the inserted currency and rate information representing the conversion rate used for conversion by the control device in association with timing information representing a timing at which the insertion process is executed; and
   a transmission device that transmits the inserted currency information and the rate information to an information processing apparatus that manages the terminal apparatus such that both the terminal apparatus and the information processing apparatus are paired to store the inserted currency information and the rate information.

2. The terminal apparatus according to claim 1, wherein the transmission device transmits the timing information that is associated with the inserted currency information and the rate information.

3. The terminal apparatus according to claim 1, further comprising:
   a third storage device that stores information transmitted from the transmission device.

4. A terminal apparatus communicably connected to a gaming machine in which a game can be played according to an inserted currency, the terminal apparatus comprising:
   a first storage device that stores a conversion rate and updates the conversion rate based on a latest exchange rate that is regularly acquired;
   a control device that executes an insertion process for converting an amount of the inserted currency into an amount of a specific currency based on the conversion rate updated in the first storage device;

a second storage device that stores, for history management, inserted currency information including currency information representing the type of the inserted currency in association with timing information representing a timing at which the insertion process is executed; and a transmission device that transmits the inserted currency information and the timing information to an information processing apparatus that manages the terminal apparatus such that both the terminal apparatus and the information processing apparatus are paired to store the inserted currency information and the timing information.

5. The terminal apparatus according to claim 4, further comprising:

a third storage device that stores information transmitted from the transmission device.

6. An information management system comprising:

a terminal apparatus communicably connected to a gaming machine in which a game can be played according to an inserted currency; and an information processing apparatus capable of communicating with the terminal apparatus, wherein the terminal apparatus includes:
  a first storage device that stores a conversion rate and updates the conversion rate based on a latest exchange rate that is regularly acquired,
  a control device that executes an insertion process for converting an amount of the inserted currency into an amount of a specific currency based on the conversion rate updated in the first storage device,
  a second storage device that stores, for history management, inserted currency information including currency information representing the type of the inserted currency and rate information representing the conversion rate used for conversion by the control device in association with timing information representing a timing at which the insertion process is executed; and
  a transmission device that transmits the inserted currency information and the rate information to the information processing apparatus such that both the terminal apparatus and the information processing apparatus are paired to store the inserted currency information and the rate information, and
the information processing apparatus includes a recording device that records the inserted currency information transmitted from the terminal apparatus.

7. The information management system according to claim 6, wherein the transmission device transmits the timing information that is associated with the inserted currency information and the rate information.

8. The information management system according to claim 6, further comprising:

a third storage device that stores information transmitted from the transmission device.

9. The information management system according to claim 6, wherein the information processing apparatus includes
a totaling device that totals the inserted currency information transmitted from the terminal apparatus, and
a fraud detection device that detects the presence or absence of fraudulent activity based on a totaled result by the totaling device and the rate information.

10. An information management system comprising:

a terminal apparatus communicably connected to a gaming machine in which a game can be played according to an inserted currency; and an information processing apparatus capable of communicating with the terminal apparatus, wherein the terminal apparatus includes:
  a first storage device that stores a conversion rate and updates the conversion rate based on a latest exchange rate that is regularly acquired,
  a control device that executes an insertion process for converting an amount of the inserted currency into an amount of a specific currency based on the conversion rate updated in the first storage device,
  a second storage device that stores, for history management, inserted currency information including currency information representing the type of the inserted currency in association with timing information representing a timing at which the insertion process is executed, and
  a transmission device that transmits the inserted currency information and the timing information to the information processing apparatus such that both the terminal apparatus and the information processing apparatus are paired to store the inserted currency information and the timing information, and
the information processing apparatus includes a recording device that records the timing information transmitted from the terminal apparatus.

11. The information management system according to claim 10, further comprising:

a third storage device that stores information transmitted from the transmission device.

12. The terminal apparatus according to claim 2, wherein the timing information that is stored in association with the inserted currency information and the rate information in the second storage is compared with the timing information that is stored in a transmission destination to which the transmission device transmits the timing information associated with the inserted currency information and the rate information so as to verify an effect of a failure when the failure occurs.

13. The terminal apparatus according to claim 12, wherein a conversion result of converting the amount of the inserted currency into the amount of the specific currency is verified based on the conversion rate at the timing represented by the timing information.

14. The terminal apparatus according to claim 4, wherein the timing information that is stored in association with the inserted currency information in the second storage is compared with the timing information that is stored in a transmission destination to which the transmission device transmits the timing information associated with the inserted currency information so as to verify an effect of a failure when the failure occurs.

15. The terminal apparatus according to claim 14, wherein a conversion result of converting the amount of the inserted currency into the amount of the specific currency is verified based on the conversion rate at the timing represented by the timing information.

16. The information management system according to claim 6, wherein the timing information that is stored in association with the inserted currency information and the rate information in the second storage is compared with the timing information that is stored in association with the inserted currency information in the recording device so as to verify an effect of a failure when the failure occurs.

17. The information management system according to claim 16, wherein a conversion result of converting the amount of the inserted currency into the amount of the specific currency is verified based on the conversion rate at the timing represented by the timing information.

18. The information management system according to claim 10, wherein the timing information that is stored in association with the inserted currency information in the second storage is compared with the timing information that is stored in association with the inserted currency information in the recording device so as to verify an effect of a failure when the failure occurs.

19. The terminal apparatus according to claim 18, wherein a conversion result of converting the amount of the inserted currency into the amount of the specific currency is verified based on the conversion rate at the timing represented by the timing information.

* * * * *